(12) United States Patent
Binzer et al.

(10) Patent No.: US 7,698,109 B2
(45) Date of Patent: Apr. 13, 2010

(54) METHOD, A COMPUTER SYSTEM, AND A COMPUTER PRODUCT FOR CONFIGURING A VIRTUAL REPRESENTATION OF AN ASSEMBLY OF A PLURALITY OF COMPONENTS

(75) Inventors: Anda Binzer, Copenhagen (DK); Thomas Randrup, Copenhagen (DK)

(73) Assignee: 3DFacto A/S, Copenhagen (DK)

( * ) Notice: Subject to any disclaimer, the term of this patent is extended or adjusted under 35 U.S.C. 154(b) by 1082 days.

(21) Appl. No.: 10/499,029

(22) PCT Filed: Dec. 19, 2002

(86) PCT No.: PCT/DK02/00878

§ 371 (c)(1), (2), (4) Date: May 23, 2005

(87) PCT Pub. No.: WO03/056470

PCT Pub. Date: Jul. 10, 2003

(65) Prior Publication Data

US 2005/0209829 A1    Sep. 22, 2005

Related U.S. Application Data

(60) filed as application No. PCT/DK02/00878 on Dec. 19, 2002.

(30) Foreign Application Priority Data

Dec. 21, 2001    (DK) .............................. 2001 01937

(51) Int. Cl.
G06F 17/50    (2006.01)

(52) U.S. Cl. .................................. 703/1; 703/6; 703/7

(58) Field of Classification Search ..................... 703/1, 703/2, 6, 7; 345/419, 420, 672; 700/98, 700/96; 713/1
See application file for complete search history.

(56) References Cited

U.S. PATENT DOCUMENTS 5,515,524 A    5/1996    Franke et al.

(Continued)

FOREIGN PATENT DOCUMENTS

WO    WO 94/12941    6/1994

(Continued)

Primary Examiner—Kidest Bahta
Assistant Examiner—Kandasamy Thangavelu
(74) Attorney, Agent, or Firm—Harness, Dickey & Pierce, P.L.C.

(57) ABSTRACT

The invention provides a method for configuring a virtual representation of an assembly of a plurality of components, by: I) storing a first set of data representing a plurality of categories of components, and, for each category, parameters and constraints defining limitations for configurations of each of the components, II) generating and storing a second set of data representing the assembly of a plurality of components, while respecting the constraints associated with each component and constraints for the assembly, and generating a third set of data representing a present configuration, III) repeating the step II) by: a) adding, to the second and third set of data, data which represent a component and which are derived from the first set of data, or b) deleting data representing a component of the second and third set of data, or c) amending data representing a previously added component of the second and third set of data, while respecting the constraints associated with each component and constraints for the assembly, so as to arrive at an updated version of the second and third set of data.

29 Claims, 22 Drawing Sheets

U.S. PATENT DOCUMENTS

| | | | |
|---|---|---|---|
| 6,725,184 B1* | 4/2004 | Gadh et al. | 703/2 |
| 6,785,805 B1* | 8/2004 | House et al. | 713/1 |
| 6,898,560 B1* | 5/2005 | Das | 703/7 |
| 7,082,387 B1* | 7/2006 | Wolfe, Jr. | 703/6 |
| 2001/0047251 A1* | 11/2001 | Kemp | 703/1 |
| 2002/0045963 A1* | 4/2002 | Tenma et al. | 700/96 |
| 2002/0089499 A1* | 7/2002 | Lee et al. | 345/419 |
| 2003/0033041 A1* | 2/2003 | Richey | 700/98 |
| 2003/0065413 A1* | 4/2003 | Liteplo et al. | 700/96 |
| 2003/0156127 A1* | 8/2003 | Kleyman | 345/672 |

FOREIGN PATENT DOCUMENTS

| | | |
|---|---|---|
| WO | WO 99/48031 | 9/1999 |
| WO | WO 99/55949 | 11/1999 |

* cited by examiner

| Component | Variable | Domain | Connection | State Value |
|---|---|---|---|---|
| Platform1 | neighbor_left | platform, none | platform2 | platform |
| · | neighbor_right | platform, none | | none |
| · | neighbor_outside | platform, none | | none |
| · | neighbor_inside | platform, none | | none |
| · | above | platform, top_module, none | platform4 | platform |
| · | below | platform, none | | none |
| · | ladder | ladder, none | | none |
| · | rail_left | rail_standard, rail_full, none | | none |
| · | rail_right | rail_standard, rail_full, none | | none |
| · | rail_outside | rail_standard, rail_full, none | | none |
| · | rail_inside | rail_standard, rail_full, none | | none |
| · | wall_inside | boolean | | true |
| · | height | low, medium, high | | medium |
| · | hole | true, false | | false |
| Platform2 | neighbor_left | platform, none | | none |
| · | neighbor_right | platform, none | | none |
| · | neighbor_outside | platform, none | | none |
| · | neighbor_inside | platform, none | | none |
| · | above | platform, top_module, none | platform3 | platform |
| · | below | platform, none | | none |
| · | ladder | ladder, none | ladder1 | ladder |
| · | rail_left | rail_standard, rail_full, none | | none |
| · | rail_right | rail_standard, rail_full, none | | none |
| · | rail_outside | rail_standard, rail_full, none | | none |
| · | rail_inside | rail_standard, rail_full, none | | none |
| · | wall_inside | boolean | | true |
| · | height | low, medium, high | | medium |
| · | hole | true, false | | true |
| Platform3 | neighbor_left | platform, none | | none |
| · | neighbor_right | platform, none | platform4 | platform |
| · | neighbor_outside | platform, none | | none |
| · | neighbor_inside | platform, none | | none |
| · | above | platform, top_module, none | top_module1 | top_module |
| · | below | platform, none | | none |
| · | ladder | ladder, none | ladder2 | ladder |
| · | rail_left | rail_standard, rail_full, none | | none |
| · | rail_right | rail_standard, rail_full, none | | none |
| · | rail_outside | rail_standard, rail_full, none | rail_full1 | rail_full |
| · | rail_inside | rail_standard, rail_full, none | | none |
| · | wall_inside | boolean | | true |
| · | height | low, medium, high | | high |
| · | hole | true, false | | true |
| Platform4 | neighbor_left | platform, none | | none |
| · | neighbor_right | platform, none | platform3 | platform |
| · | neighbor_outside | platform, none | | none |
| · | neighbor_inside | platform, none | | none |
| · | above | platform, top_module, none | | none |
| · | below | platform, none | | none |
| · | ladder | ladder, none | | none |
| · | rail_left | rail_standard, rail_full, none | | none |
| · | rail_right | rail_standard, rail_full, none | | none |
| · | rail_outside | rail_standard, rail_full, none | | none |
| · | rail_inside | rail_standard, rail_full, none | | none |
| · | wall_inside | boolean | | true |
| · | height | low, medium, high | | high |
| · | hole | true, false | | false |
| ladder1 | length | low, medium, high | | medium |
| · | (parent) | | platform2 | |
| ladder2 | length | low, medium, high | | high |
| · | (parent) | | platform3 | |
| top_module1 | rail_left | rail_standard, rail_full, none | | none |
| · | rail_right | rail_standard, rail_full, none | | none |
| · | rail_outside | rail_standard, rail_full, none | | none |
| · | rail_inside | rail_standard, rail_full, none | | none |
| · | wall_inside | boolean | | true |
| · | (parent) | | platform3 | |
| rail_full1 | length | short, wide | | wide |
| · | (parent) | | platform3 | |

Fig. 22

METHOD, A COMPUTER SYSTEM, AND A COMPUTER PRODUCT FOR CONFIGURING A VIRTUAL REPRESENTATION OF AN ASSEMBLY OF A PLURALITY OF COMPONENTS

This application is the national phase under 35 U.S.C. §371 of International Application No. PCT/DK02/00878 filed on Dec. 19, 2002, and claims priority to Danish Application No. PA 2001 01937, filed Dec. 21, 2001 and also to U.S. Provisional Application No. 60/343,304, filed on Dec. 8, 2006, the entire contents of each of which are incorporated herein by reference.

TECHNICAL FIELD

The present invention relates to configuring of systems with the aim of supporting real-time visualization of configuration problems for complex products. The invention provides a general method for formulating a product model by use of abstract components. The invention is useful in a runtime environment, e.g. electronic sales, for visual configuration of products with real-time visual feedback.

BACKGROUND OF THE INVENTION

The configuration of a product may be seen as the process of navigating a parameter space to arrive at one configuration (of the product), often called a variant of the product or a customized product.

In the present context, a parameter should be understood as one or more properties, usually stored in a variable in a computer program, of a component. For example, a component may have a material parameter to which different values may be assigned, such as oak, beech, mahogany, teak, etc., a color parameter, such as blue, green, yellow, etc., a size parameter, such as small, medium or large, a light reflection parameter, such as shiny or mat, etc.

For example, a car has a finite state space. Its system of legal solutions can be defined by a finite number of parameters and the process of configuring a car is equivalent to navigating in a finite state space by choosing a value on each of the finite number of parameters. In contrary, a kitchen is built from a varying number of cabinets and accessories, and, hence is having a varying, and possibly unlimited, parameter space depending on the number of cabinets. For each new cabinet In a kitchen the parameter space changes.

A more general example is buildable products. A buildable product is a product which consists of a number of subproducts, which can be built together (in some sense) to yield a whole. In a sense, most physical products can be seen as buildable. However, a product is usually called buildable if the product is not strictly confined to a specific number of items. This could be considered as different products having a very differing number and/or combinations of subproducts, which are built together. For example, a car will always have the same number of similar essential parts, like four wheels and one engine, while a kitchen's essential parts comprise a differing number of cabinets. The building blocks may in themselves very well be configurable or buildable products.

It is usually difficult to build a satisfactory product model of most buildable products. One problem is to get a hold of the number of variations, since each building block is configurable but dependent on all the others. One way to get around this is to fix the number and combinations of subproducts and then describe all interrelationships.

Furthermore, for many buildable products the connection between subproducts can often be of a very basic physical nature, which is difficult or even impossible to describe in logical terms of the product model. For instance in a kitchen, the drawers of a cabinet have a very clear logical (or structural) relationship with the cabinet its in; for example there may be 3, 5 or 7 dependent on the size. However, the relationship between two cabinets in two different connection groups is not necessarily known.

Therefore, several problems exist. Firstly, the combined overall logical rules of a buildable product do not relate very well to the classical product model description. Secondly, the interrelationships in buildable products are not easy to describe in terms of logical constraints.

Two types of configurators based on rules are known; search algorithms (e.g. using tree structures) or storing all valid combinations in a database, based on logic. Neither of these techniques addresses the problems mentioned above. Moreover, many obvious and simple rules are of a geometric nature or refer to the products geometric nature. They are very hard to formulate in a logical language. Thus, it is an object of the invention to facilitate the building of products based on the component principle, and to enable the creation of a product model.

SUMMARY OF THE INVENTION

In a first aspect, the invention provides a method for configuring, in a memory of a computer system, a virtual representation of an assembly of a plurality of components, the method comprising the steps of:

storing, in a database of the computer system, a first set of data representing a plurality of categories of components, and, for each category, parameters and constraints defining limitations for configurations of each of the components within each of the categories, whereby all components in a category have common parameters and constraints, generating or defining a second set of data representing the assembly of a plurality of components and representing a configuration space of said plurality of components, and storing the second set of data in a memory of the computer system, the step of generating being performed while respecting the constraints associated with each component and constraints for the assembly, and generating a third set of data representing a present configuration in the configuration space, repeating the step of generating or defining by:
  adding, to the second and third set of data, data which represent a component of a category and which are derived from the first set of data, or
  deleting data representing a component of the second and third set of data, or
  amending data representing a previously added component of the second and third set of data, while respecting the constraints associated with each component and constraints for the assembly, so as to arrive at an updated version of the second set of data, and at an updated version of the third set of data.

The repetitive generation of the second and third set of data allows for a product model, which is not limited by a confined number of components or a confined space. Further, by having constraints defining limitations for configurations of each of the components stored in a database and by respecting these constraints while generating the second set of data, the need for storing all possible combinations of components is eliminated. Analogously, by automatically generating and preferably storing data representing constraints for the assembly, a product model may be built in a flexible, memory and data processing efficient manner.

It should be understood that the updated version of the second set of data may be obtained in consequence of a change in the third set of data, so that when the step of generating is repeated, the third set of data is updated, e.g. in response to user input, whereby the second set of data is automatically updated.

At the step of generating the third set of data, the method may further comprise offering a plurality of components or component categories, and repeating the step of offering, whereby, when the step of offering is repeated, only selected components or component categories are offered. Thus, a user of the computer system may save time when configuring a product, and at the same time it is prevented that illegal or not-allowed combinations of components are being generated.

Data representing components may comprise data representing parameters of the components, in which case the method further comprises, at the step of generating the third set of data, offering a plurality of parameters of components, whereby only selected parameters are offered, the selected parameters being selected in accordance with constraints of components in such a way that only possible and/or legal combinations of components and parameters are achievable.

Furthermore, at the step of offering components and/or parameter values, only components and/or parameter values, which respect constraints associated with each component, and which respect constraints for the assembly may be offered.

In the present context, a component should be interpreted not only as the physical component but also or alternatively its data representation in the memory of the computer system, possibly including parameters and/or characteristics of the component.

The method may comprise visualizing, on a display device or printer associated with the computer system, a graphical or physical representation of at least a part of the configuration space represented by the second set of data and/or at least a part of the configuration represented by the third set of data. The computer system may be connected to a communications network, in which case the method may further comprise:

sending the second and/or the third set of data, via the communications network, to a further computer system, and visualizing, on a monitor of said further computer system or any other device for displaying, a graphical image of the configuration space represented by the second set of data and/or a graphical image of the configuration represented by the third set of data.

Thus, data may be communicated via a communications network, such as the Internet or a Local Area Network (LAN), so that a user or potential buyer of a product, for example of a kitchen, may configure the product from a location remote from the location of the computer system.

The second set of data may further comprise data representing relationships between related components and the type of relationships between components, whereby the second set of data also represents connections between components.

During the step of generating, the step of adding may comprise connecting components in an assembly and/or adding a component to the assembly. Analogously, the step of deleting may comprise disconnecting two components in the assembly and/or removing a component from the assembly. Finally, the step of amending may comprise at least one of:

amending data representing at least one component of the assembly, connecting two components of the assembly, and disconnecting two components of the assembly.

In one embodiment of the invention, the step of generating comprises creating a set of clusters, each cluster containing data representing a single component as well as optionally at least one further component which is related to the single component, whereby the set of clusters contains data representing all components comprised in the virtual representation. The relationship between components may be either a physical or a logical relationship. A physical relationship may for example comprise a physical connection between two components, whereas a logical relationship for example limits the possible parameters or parameter values which may be assigned to a component, for example the wood from which a kitchen door is made being limited to oak or beech, whereas other kitchen components may also be made from teak or mahogany. The second data may comprise data representing the type of relationship between related components.

The second set of data may further comprise a separate data structure or a set of separate data structures which define(s) possible or allowed combinations of components and/or parameter values, the separate data structure or structures being included in the second set of data in such a way that each separate data structure is associated with a particular component, whereby at least one of the constraints of the particular component may reflect said possible or allowed combinations of components and/or parameter values.

Thus, the separate data structure associated with the single component may define possible or allowed combinations of components of the cluster corresponding to the single component and/or parameter values of the components of the cluster corresponding to the single component.

The separate data structure may preferably constitute a configuration database in which data representing possible or allowed combinations of components and/or parameter values are stored.

The step of generating the second set of data may further comprise:

performing, for each cluster, a check of whether the data representing a component of that cluster, are compatible with constraints defined by mutually connected components in that cluster, and if the check reveals non-compatibility:

amending the second set of data and/or the data representing the component in question while respecting constraints conferred by all mutually connected components.

The second set of data may further comprise data representing the geometry of at least a part of the assembly, whereby the constraints of the components of this part of the assembly define constraints of a geometric nature on the parameters of the components.

Furthermore, the third set of data may represent a state of the present configuration, and the method may comprise, at the step of repeating, automatically updating the second set of data in response to changes to the third set of data. Such a change to the third set of data may for example be altering the value of one or more parameters. In case a parameter is representing a component, alteration of such a parameter may initiate that the component is inserted/removed from the assembly and/or that a connection involving the component is inserted/removed. Thus, the present configuration is reproducible from the first and third set of data.

In a second aspect, the invention relates to a computer system for configuring, in a memory of the computer system, a virtual representation of an assembly of a plurality of components, the computer system comprising:

a database storing a first set of data representing a plurality of categories of components, and, for each category, parameters and constraints defining limitations for configurations of each of the components within each of the categories, whereby all parameters and components in a category have common constraints, a processor which is programmed to generate a second set of data representing the assembly of a plurality of components and representing a configuration space of said plurality of components, and to store the second set of data in a memory of the computer system, the processor being programmed to generate the second set of data while respecting the constraints associated with each component and constraints for the assembly, the processor being further programmed to generate a third set of data representing a present configuration in the configuration space, the processor being further programmed to repeat the generation of the second set of data by:

adding, to the second and third set of data, data which represent a component of a category and which are derived from the first set of data, or deleting data representing a component of the second and third set of data, or amending data representing a previously added component of the second and third set of data, while respecting the constraints associated with each component and constraints for the assembly, so as to arrive at an updated version of the second set of data, and at an updated version of the third set of data.

The computer system may be programmed to perform the steps described above in connection with the method of the first aspect of the invention.

In a third aspect the invention relates to a computer program product for configuring, in a memory of a computer system, a virtual representation of an assembly of a plurality of components, the computer program product comprising means for:

storing, in a database of the computer system, a first set of data representing a plurality of categories of components, and, for each category, parameters and constraints defining limitations for configurations of each of the components within each of the categories, whereby all parameters and components in a category have common constraints, generating a second set of data representing the assembly of a plurality of components and representing a configuration space of said plurality of components, and storing the second set of data in a memory of the computer system, the step of generating being performed while respecting the constraints associated with each component and constraints for the assembly, and generating a third set of data representing a present configuration in the configuration space, repeating the step of generating by:

adding, to the second and third set of data, data which represent a component of a category and which are derived from the first set of data, or deleting data representing a component of the second and third set of data, or amending data representing a previously added component of the second and third set of data, while respecting the constraints associated with each component and constraints for the assembly, so as to arrive at an updated version of the second set of data, and at an updated version of the third set of data.

The invention also relates to a computer readable data carrier loaded with the computer program product, a computer readable data signal embodying data generated by the computer program product, and to a computer system comprising memory or storage means loaded with the computer program product. The computer program product may comprise means for performing all or some of the steps described above and below in connection with the method of the invention.

DETAILED DESCRIPTION OF THE INVENTION

The scientific problem addressed within configuration technologies is to construct and navigate in a dynamical state space of legal solution to a given system. Abstractly speaking, to configure (a product) is the process of navigating the parameter space to arrive at one configuration (of the product).

A product is some system or physical object or group of objects, which together constitutes some kind of whole. A buildable product is a product, which consists of a number of subproducts, which can be build together (in some sense) to yield a whole.

In configuration terminology a product model (PM) is a description of all parameters in the full system and a description of which combinations of parameter values are legal, and these represent legal (or valid) products in a configurator. In this terminology, the configuration process consists of navigating the parameter space spanned by the parameters while respecting rules of the product model yielding a legal configuration of the product.

Mathematically speaking, the product model describes a parameter space having $M^{N*P}$ values, each corresponding to one possible configuration of the product. Here is assumed that the system consisting of P sub-systems each having N parameters each of which again has M possible values. If the P sub-systems are non-connected, then the parameter space is having $(M^N)*P$ values only. However, the sub-systems have some sub-spaces, where they are connected. Hence, the parameter space is having $(M^{(N+O)})*P$ values; which is less complex that the system $M^{N*P}$ for a small number O, i.e. for small overlap of sub-systems. In other words, by adding some extra parameters describing the connectedness to each sub-product a less complex system is determined, and this is a great advantage when the number P of sub-systems is not known initially.

In the present invention, the componentized product model is invented for the purpose of describing an, in principle, infinite (or unlimited) parameter space (i.e. number of parameters), in which each component (P above) has a finite number of parameters (N above) each with a domain of values (M above), while the full system may comprise an unlimited is not known initially and can consist of any number of components. These components are part of the data structure and each component is associated with a number of state variables.

In a special case, a component is directly related to an object, which has a geometric representation. The object is normally a physical object of the product and its geometry can be visualized in the associated visualization system on any device as a consequence of changes in the PM. Any electronic device, which can display the geometry can be used for visualization.

The classical assumption, that all parameters are the sum of all the parameters of all components is by definition infeasible to describe, since the product model in use is extended by building new components (model merging) to the existing componentized product model to yield a new configuration of the product.

An important concept of the present invention is state-based configuration, which comprise a particular data structure representing the parameter space, and an associated method to navigate the parameter space (also called the state space).

In this method all parameters are represented by state variables, which all have exactly one value at any time. The collection of values of all state variables is called the state and represents exactly one configuration of the product. Equally important, is the ability to navigate in the parameter space by changing one (or more) variable at a time, until arriving at a satisfactory configuration. In a sense, this type of configurator enables the user to move around in the parameter space. The alternative is to narrow down some acceptable subset of the parameter space, and only at the very end arrive at one particular configuration of the product.

Consider products, which are physical in a sense, for example a scaffold. One benefit of the state representation is that it enables presenting the configuration visually to a user during the configuration process. By visualization of a virtual representation of a product is meant a visualization of the product, and not some abstract showing of the parameter space. The problems involving configuring a product and at the same time display the result is a known problem in field of configuration technology. Notice that state based configuration is in the very core of how this type of configurator works and its implications and benefits are not at all restricted to the visualization.

A central part of the invention is the concept of having a componentized product model (componentized PM). The componentized PM consists of two PM-related parts. One part is the static description of the PM and the other part is dynamic. This is necessary for the usefulness in applications that involve building a product from individual components In the PM and the full product changes dynamically, and consequently the (necessarily static) description of the model have to be separated from the model itself.

The static description is called the fragmentized product model, and it consists of a finite number of PM-fragments. PM-fragments are the building blocks of the PM. Each PM-fragment contains a set of product parameters.

A PM-fragment is a building block in the PM context whereas a component is a building block in the product context. However, a PM-fragment is often associated directly with a component or a component group.

The dynamic description is called the instant product model and it contains a set of PM-fragments combined. In other words, the instant PM is the sum of its PM-fragments in a unique combination depending on each other. Note that the instant PM normally includes many PM-fragments of the same category, where PM-fragments of the same category is defined as PM-fragments with the same set of parameters, but where the parameters may have different values.

In summary, the componentized PM consists of the fragmentized PM and the instant PM as illustrated in FIG. 1.

In a runtime environment using the componentized PM, the first instance is a PM-fragment, which initializes the instant PM. Thereafter, changes in the componentized PM are done by model changing of the instant PM, and each change usually yields a new structure of the instant PM and/or its PM-fragments.

The whole foundation of being able to do this relies on a local combination yielding what is call a PM-clustering in which all PM-fragments are put into their contexts. This implies that the impact of a particular component, or rather its state, is only local. At least, only local direct impact, since the change in its own cluster (context) may feasibly propagate to other clusters, through the cluster overlaps.

The invention relates to configuring a complex system, which may be build up from a plurality of system components (components for short). To distinguish, the entire system is called the scene.

To configure in a state based system means changing the state, while respecting the rules of a product model. The product model (of a system) in a configurator comprises a description for all parameters available, and the rules they must obey. Mathematically, it comprises a parameter space, which is a Cartesian product of all the involved parameters Individual domains, and a set of rules, essentially describing a subset of the parameter space called the legal parameter space.

In relation to configurators, each point in the parameter space is called a configuration of the system in question, and if this point is in the valid subset this configuration is said to be legal (or valid). To configure (a system) comprise generating data representing one (or possibly multiple) configuration. Note that a configuration (point in the parameter space) comprises exactly one value of each parameter.

The meaning of a state based process approach to configuring is that the configuration process basically consists of navigating from configuration (called states) to configuration by making changes state variables, each representing individual parameters, one or more at a time, usually all the time staying within the legal subset.

In a given state of the entire system, the intersection between the legal parameter space and the domain of a parameter is called the legal values of the parameter. These are exactly the values which this variable may be assigned without creating a conflict with another variable, i.e. breaking a rule.

Essentially, there are three separate data structures involved in the method:
  1st set of data: A fragmentized product model, which is a set of definitions of component categories (model-fragments), each comprising data defining the number and sorts of parameters for this category of component, and the behaviors of such a component.
  2nd set of data: An instantaneous product model, which is the product model of the presently assembled system, comprising a representation of all the parameters of the components in the scene, and the subset of parameter space, which is presently legal.
  3rd set of data: A state, which exactly point out the present point in the parameter space (representing the present configuration).

BRIEF DESCRIPTION OF THE DRAWINGS

FIG. 22 shows the parameter space of the configured scaffolding system.

DETAILED DESCRIPTION OF THE DRAWINGS

The state variable represents exactly one parameter in the PM, and it is the point, where the data and rules from the PM are directly connected to the configuration process.

A state variable is associated with a domain, representing all the values available for this parameter. It does not make any sense to assign anything not in the domain to a variable.

At a given time a subset, possibly all, of the domain values are said to be legal, while the rest is illegal. This is something that changes dynamically, contrary to the domain, which is static. Notice, which values are legal at a given time reflects the PM's reaction to the present state, that is, given the state of the entire system, which values can be assigned this variable without bringing the entire system in an illegal state. Thus, indirectly it reflects the variables interaction with other variables.

Figure 2:
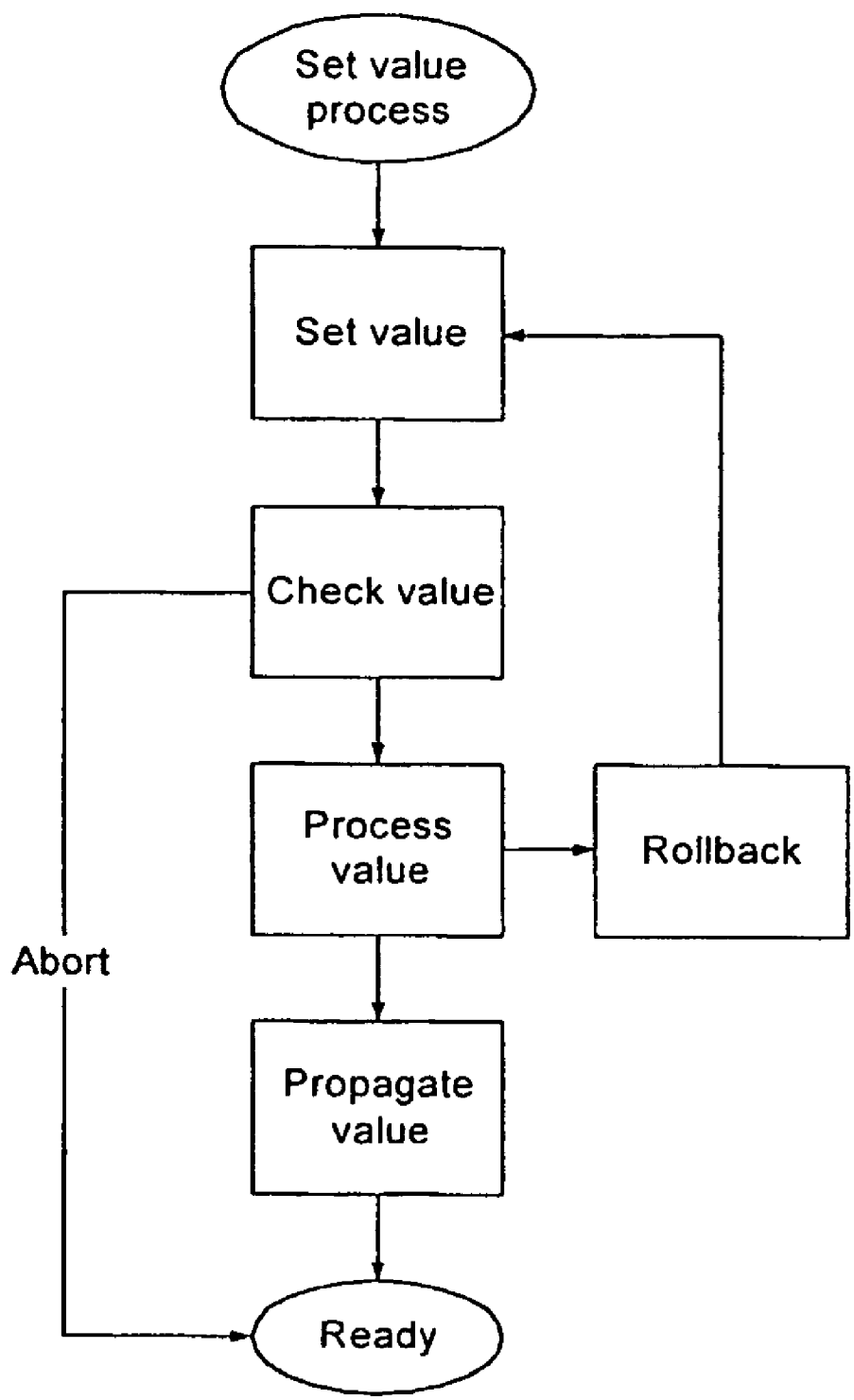
FIG. 2 contains an overview of the steps in a process for setting values.
Figure 3:
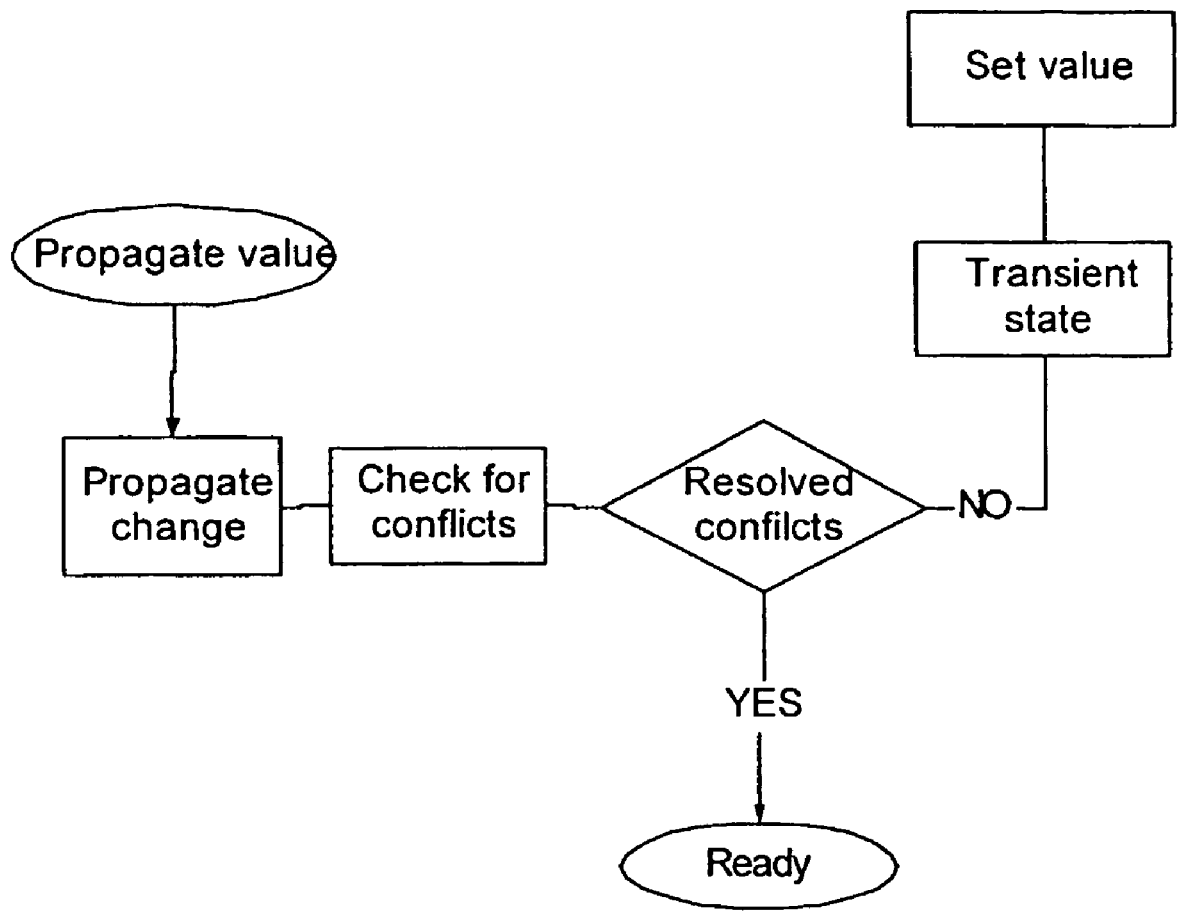
FIG. 3 shows a propagate value step of the process for setting values.

As mentioned, a state value has exactly one value at any time, and the term the variable is set with the value is used. This value is one of many in the domain, and only the set value process can change it. An overview of each step in the set value process is given in FIG. 2. If the set value process results in an illegal state, the process is said to go into conflict, see the propagate value step in FIG. 3. Depending on the explicit settings of the system this may be resolved in different ways. One example is to use simple rollback of the variable in question, another is to call the entire state transient and exploit the quite advanced transient state resolution mechanism, to identify which other variables values should be adjusted to give a legal state.

Figure 4:
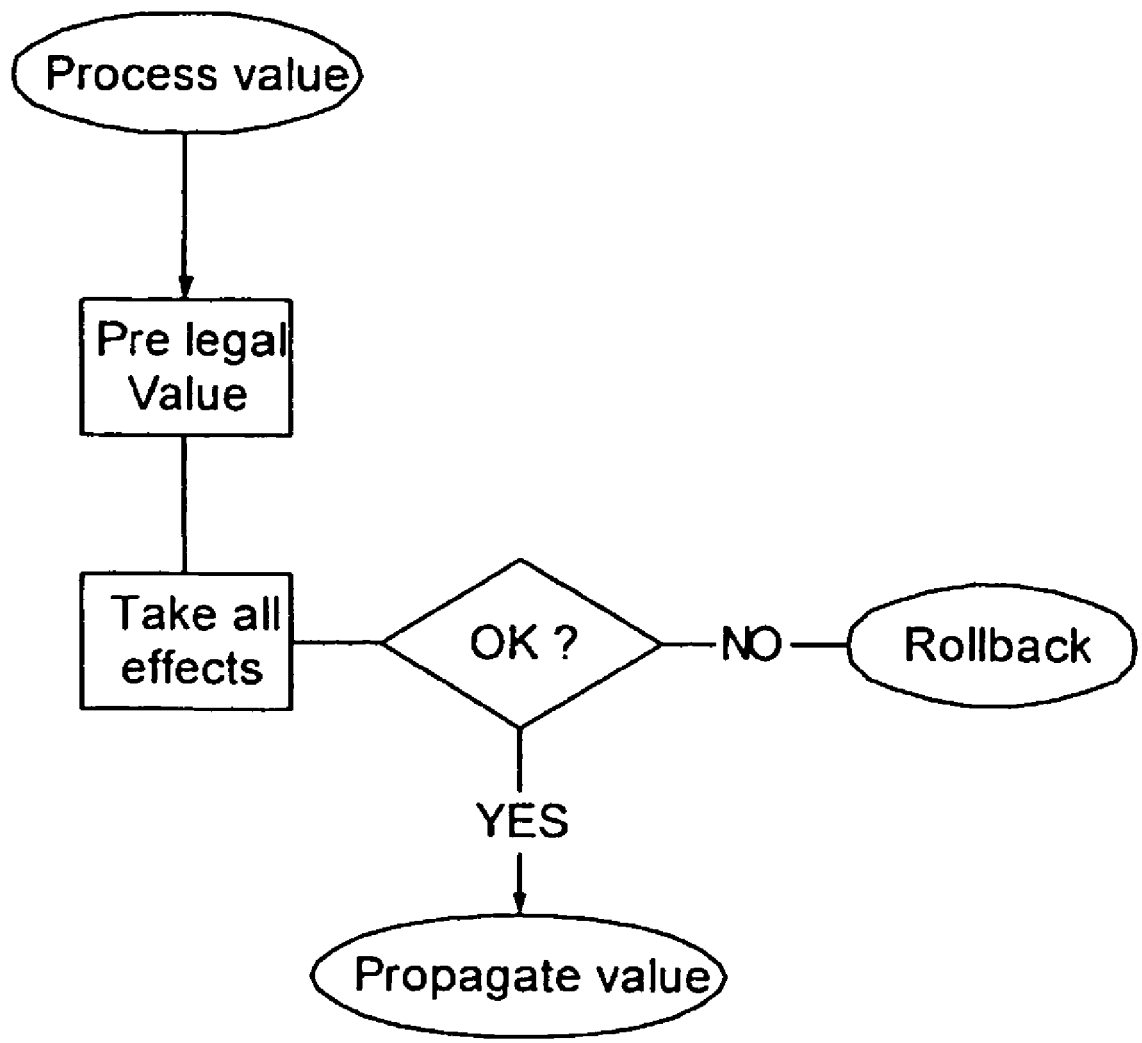
FIG. 4 shows a process value step of the process for setting values.

A state variable can be assigned a number of constraints, which can dynamically limit which of the domain values are legal. In other words, the constraints control which values are legal. Moreover, a state variable can be assigned a number of consequences or effects, which are triggered during the set value process in the process value step, see FIG. 4.

Figure 5:
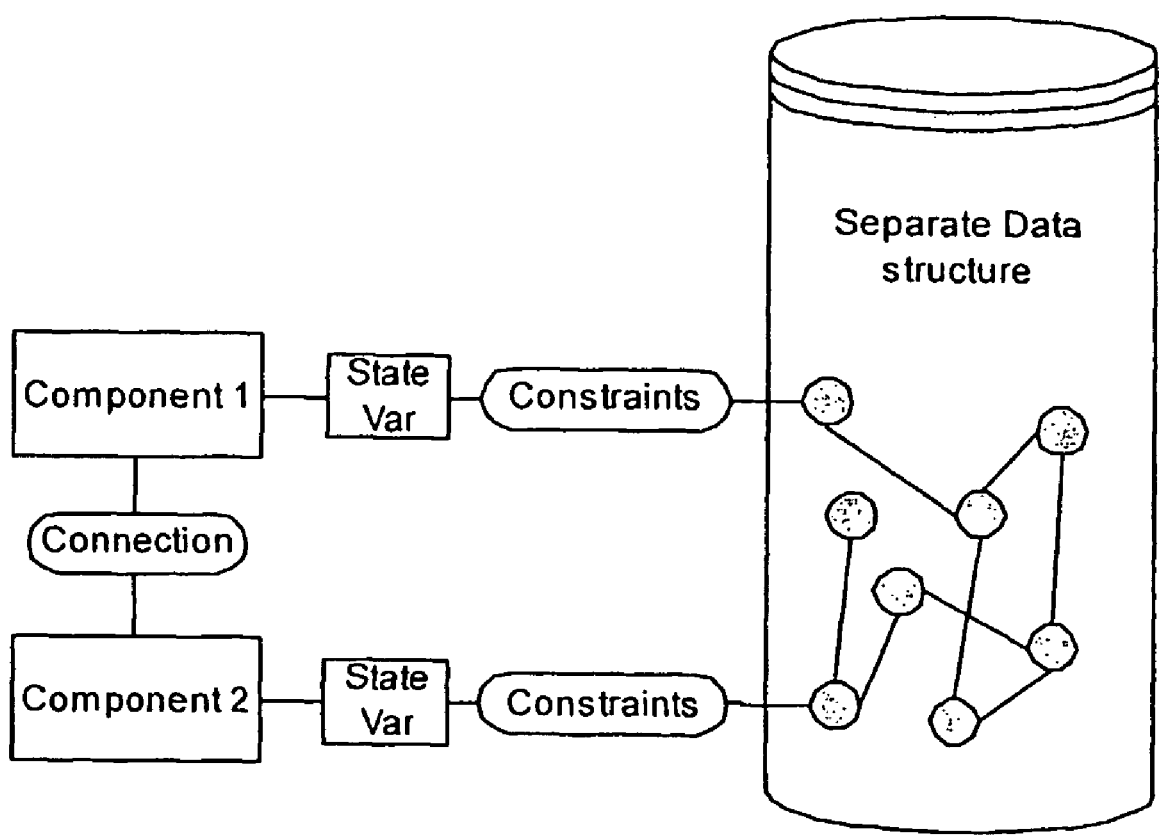
FIG. 5 illustrates constraints between components through a separate data structure.

The rules determining the legal part of the parameter space are modeled by assigning constraints to each state variables. A constraint can be considered kind of a link to a separate data structure or even an external data structure, in which information of particular aspects of the current system is collected and processed, see FIG. 5. Each constraint is then a particular interpretation of this information, which is relevant for a particular state variable. For example, having a data structure representing purely geometric information of a system of objects allows the use of constraints representing geometric properties of the system. Another example is some calculation done in the separate external data structure, which in turn affects the parameter space via the state variables. A third example of a separate data structure is a database with all legal combinations of a given (local) system of variables, i.e. a logic configurator of the system.

An important point here is that the constraint is assigned to exactly one state variable, which is then indirectly linked to its data structure, but the data structure can, and usually does, have multiple state variables thus linked to it. This is exactly how state variables can interact with each other; not directly, but through their respective reactions to changes in such a data structure.

Apart from constraining the legal values of a state variable, all constraints have a consequence or effect upon its data structure, meaning that the data structure changes upon setting a state variable with a constraint associated. This is the mechanism for assigning a consequence or effect to a state variable.

Figure 6:
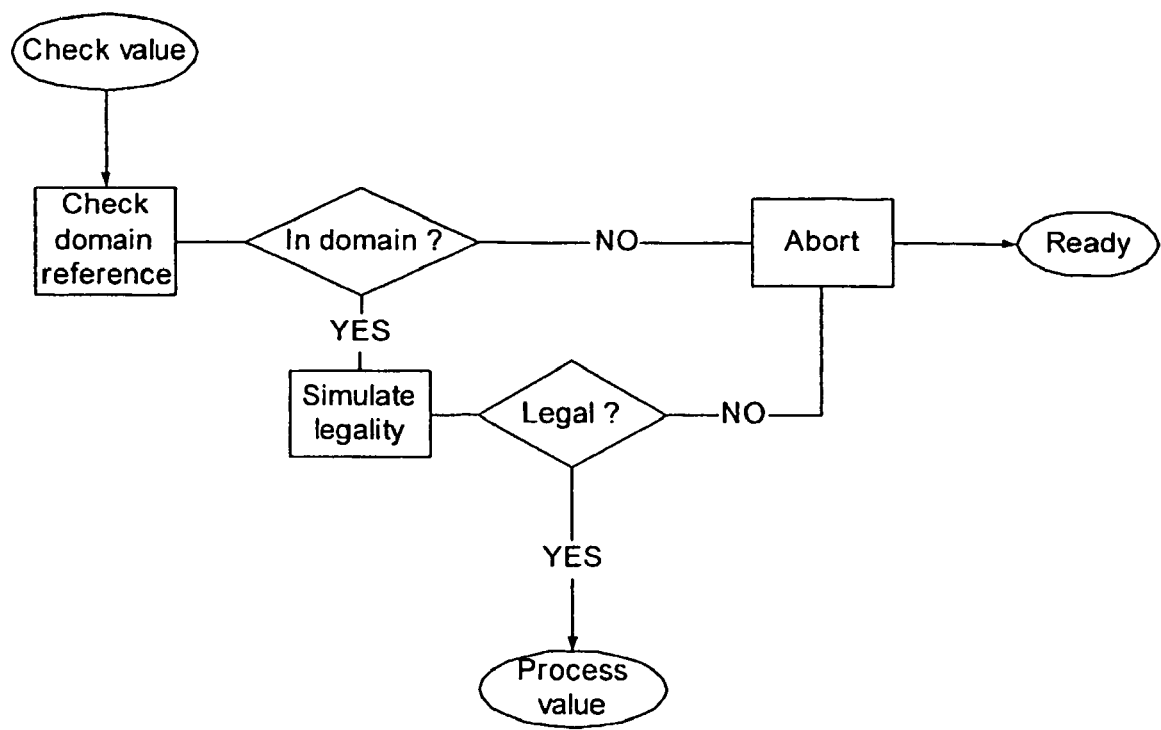
FIG. 6 shows a check value step of the process for setting values.

In practical use, a constraint is simulatable, if it is possible to check the legality of a value without taking the consequences of it. This is usually just a question of performance of the particular implementation, and thus not really relevant to the abstract process. It is mentioned, because it is of such a great importance in a practical implementation of the method. See FIG. 6 for flow of the check value step.

Thus, if a constraint is not simulatable it cannot be checked before some effects are triggered. If a value is found to be illegal in such a situation, the state value is in conflict, and a rollback mechanism is performed. The most common rollback mechanism is just to reverse the setting procedure; however, this is not always possible and/or desirable in a given situation. Another rollback mechanism is using weighted schemes of effects where the effects have different priority according to the weighting given in the scheme.

Figure 7:
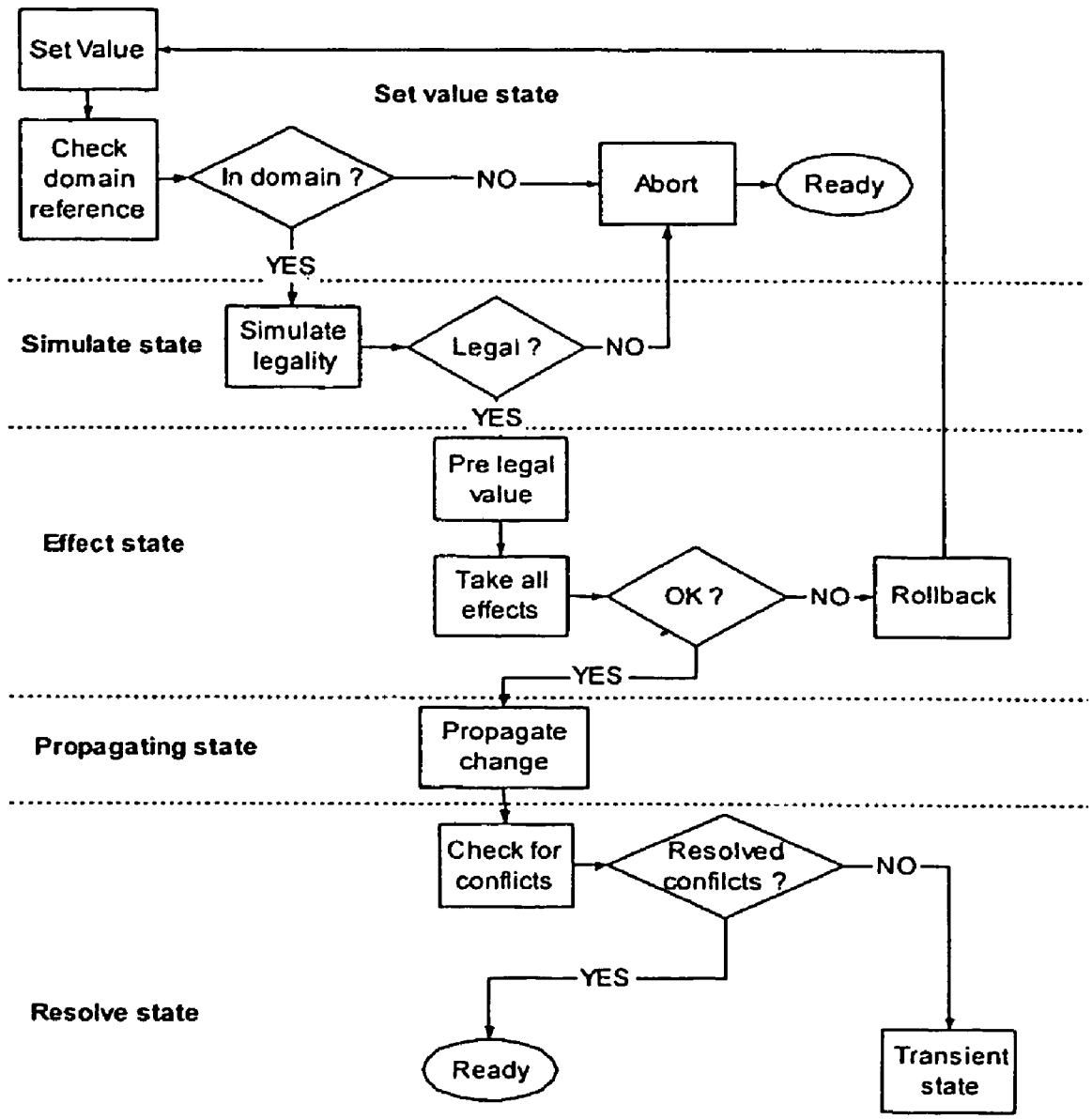
FIG. 7 illustrates a state-based method divided into different states during the process for setting values.

The state-based method divided into its different states during the set value process is shown in FIG. 7.

When such a data structure has been thus changed, other variables associated with this data structure may have had their situation changed, and should be notified. This is also handled by the constraint. Thus, a constraint can be alerted by changes in the associated data structure, and can notify the state variable of such changes. The reaction to such changes can be of different kinds, but there are some noteworthy basics. In the first instance, it leads to updating the currently legal values, but it can also lead to actually setting the value of this variable.

Setting a single variable can lead to setting other variables via the constraint-effects relation, which can in turn lead to setting other variables, thus propagating the consequences. This process is called effect cascading (or just cascading). Note that this is not restricted to staying within one PM fragment, it can very well spread out to the entire instant PM, though it very rarely does in practice, since it is very wise to insert propagating stops to control this process.

Figure 8:
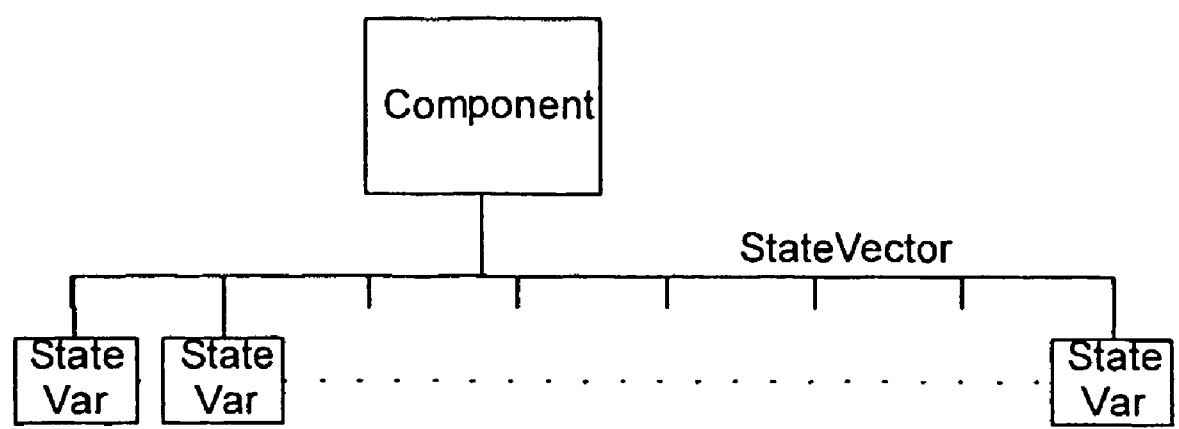
FIG. 8 illustrates a component and its state vector with state variables.

A component is a part of the data structure (of a PM fragment) and each component is associated with a state vector comprising one state variable for each of the components parameters, see FIG. 8. The effect on the component is controlled through these state variables. For example, if a particular state variable is set on a component, this could have a visual effect.

Recall that the component represents a product building block. An entire (complete or part of a) product is composed of a number of such blocks represented by a number of components. A product can be composed, by making pairwise connections between the subproducts. Fitting with the buildable product concept, components can be pairwise connected yielding a data-structure called the component hierarchy (or assembly), which is mathematical called a component graph.

Each component can have a (dynamically changing) number of connections (or structural connections) to other components. Connections are reflexive, so the connections are two-way, in the sense that if a component is connected to another, the other is also connected to the first. As noted earlier, part of the PM of a component is the component's relations to other components, which may play a role to the given component, and often this will be modeled by having a particular state variable, which has as its value another component. This particular state variable is called a component variable. The actual value is a component category corresponding to a PM-fragment, while it still holds the particular instance of a component category, which is the component. To clarify, if a component (say C2) is the value of a component variable (say Neighbor1) in another component (say C1), then C2 plays the role Neighbor1 in the PM of C1.

Within the PM of a component, a component variable is just a state variable. However, (part of) the effect of (setting) a component variable is to establish a connection between its component and the value component. Note that this may include setting a variable in the other component with this component variable.

PM-fragments are the building blocks of the overall PM of a system. Each PM-fragment contains a set of parameters of the system. A PM-fragment is a building block in the PM context, and in many cases is the PM-fragment equivalent to a component or a group of components.

Figure 1:
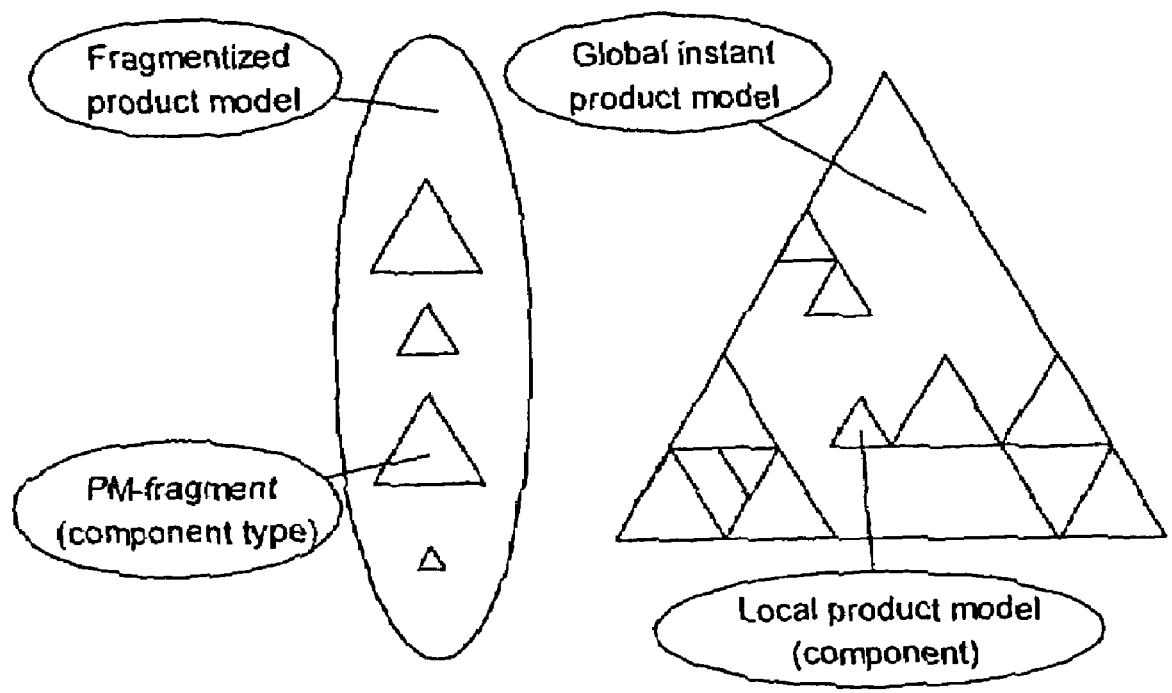
FIG. 1 shows a conceptual drawing of a componentized product model.
Figure 15:
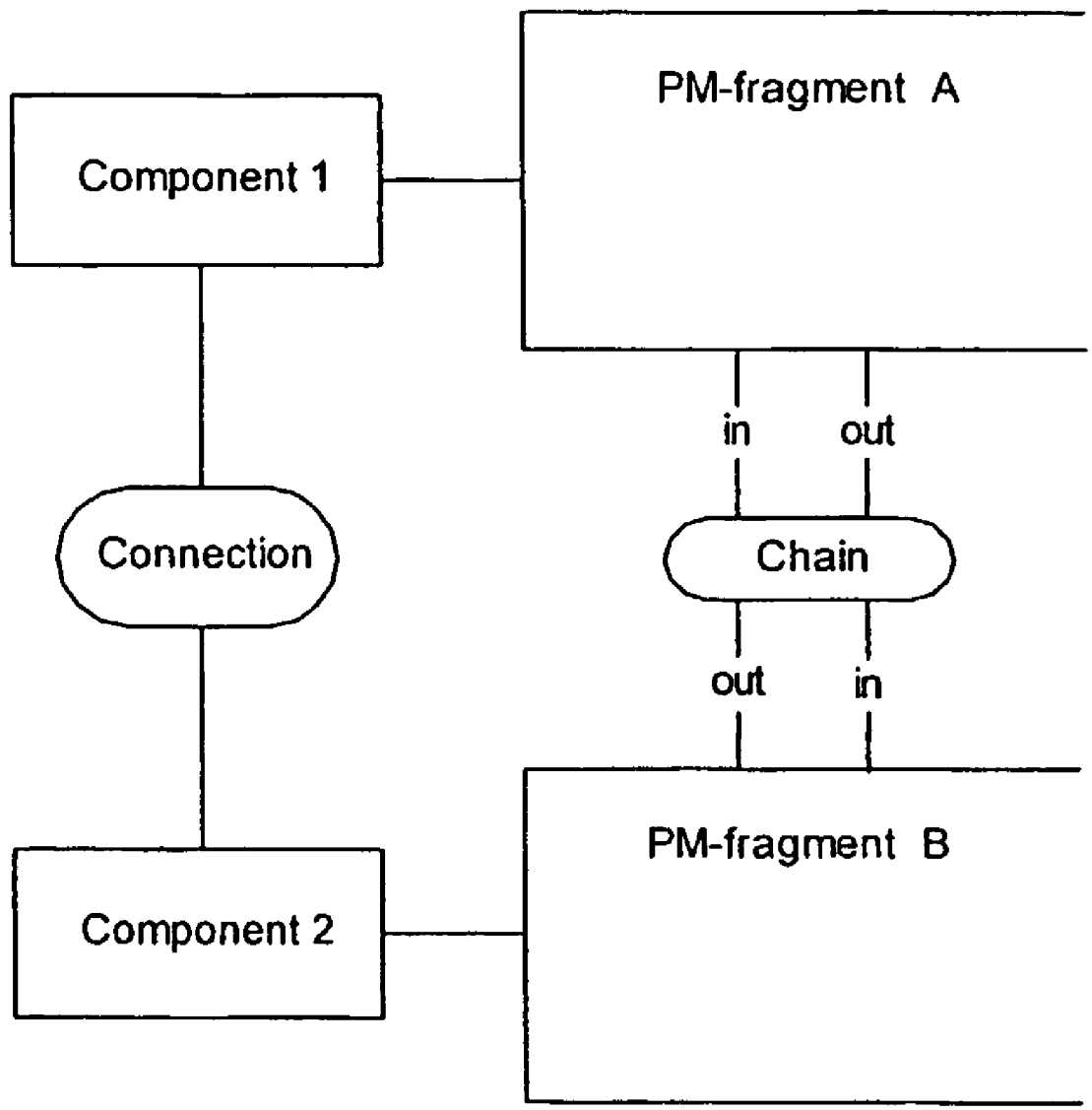
FIG. 15 illustrates model chaining as a result of a connection between two components.

Model chaining is the abstract process of combining a number of PM-fragments in an instant PM. In practice, model chaining can take place over a structural connection (between components), and is the way to make two PM-fragments talk to each other. This is also part of promoting the fragment into a part of a full instant PM (see FIG. 1 and FIG. 15).

On component level, all interaction between components in a component hierarchy takes place using chaining, and chaining always takes. place within a cluster. This is essentially the definition of a cluster.

If two components are connected, one can establish chains between the state variables.

Such chains establish some relation between the value of one state variable and the other state variable. The relation can be of different kinds, examples are one-way mirroring, sharing, and in logic implementation, constraint transference. In abstract terms, as a whole this constitutes what is usually known as model chaining the local PMs of the two components.

The simple situation is when the PM-fragments are independent of each other. In general, the PM-fragments are highly dependent of each other in a complex pattern. To control this pattern clustering is used.

In the runtime environment, all the PM-fragments are, at least in principle, combined into the Instant PM. In principle only, since the whole foundation of being able to do this relies on a local combination yielding what we call a PM-clustering in which all PM-fragments are put into their contexts.

The concept of clusters Is an integrate part of a componentized PM together with model chaining. All components are associated with a PM-fragment. The model chaining comes into play when a component's behavior depends on its neighbor component's state variable. This complete PM-fragment of one component's behavior is called the local (componentized) product model. In principle, it can be dependent on any number of its neighbor components state variables or reach into any number of levels of neighbor's neighbors. This overlapping of state variables in different local models, making them dependent, is exactly model chaining. The collection of components, which are involved In one local componentized product model, is called a cluster.

Thus, the instant PM, which is a global componentized product model, consists of the local models, which with the overlapping clusters yield a complete covering of all components. The components, which take part in multiple clusters, are the ones that are included in the model chaining.

Figure 9:
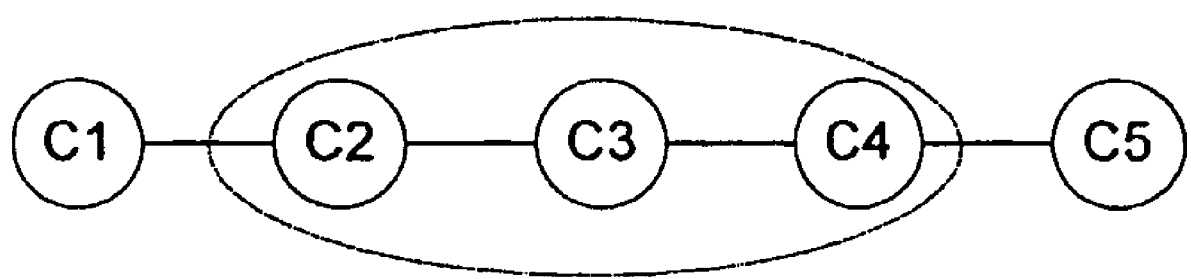
FIG. 9 shows a cluster of C3, which involves C2 and C4.
Figure 10:
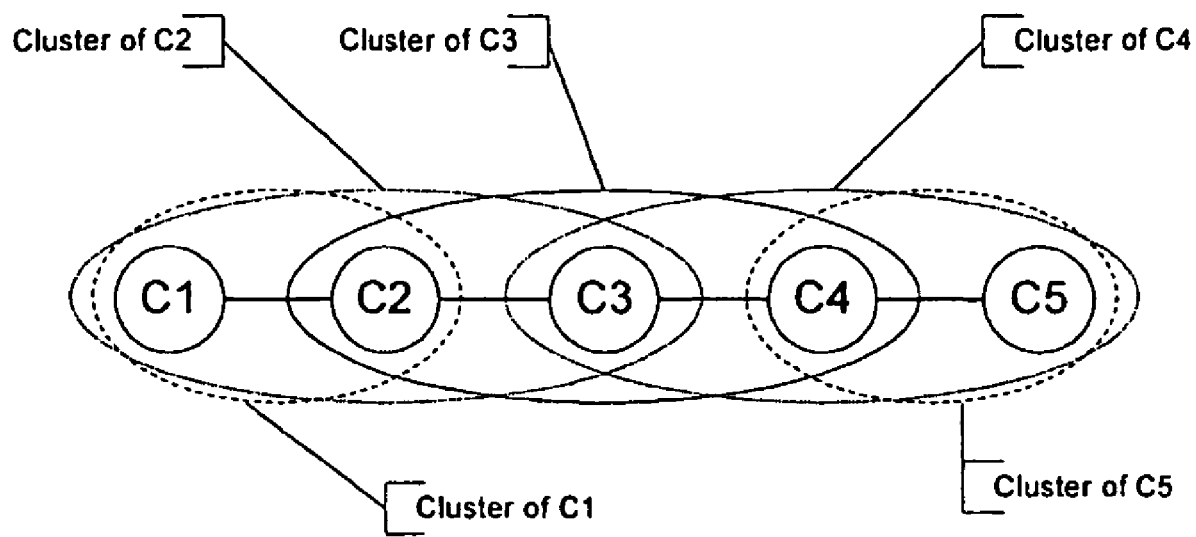
FIG. 10 illustrates a set of overlapping clusters, wherein the cluster of C1 contains only two components.

To give an example, imagine a category of component, which have two neighbors, and imaging five of these linked in a chain. The local model of one component depends on its neighbors, but nothing further. So the cluster of C3 involves C2 and C4, see FIG. 9. To illustrate how the global product model consists of overlapping clusters, see the complete picture in FIG. 10 for a product model with five components. Notice that C1 and C5 only have one neighbor in this case, so in their clusters there are only two components.

Figure 11:
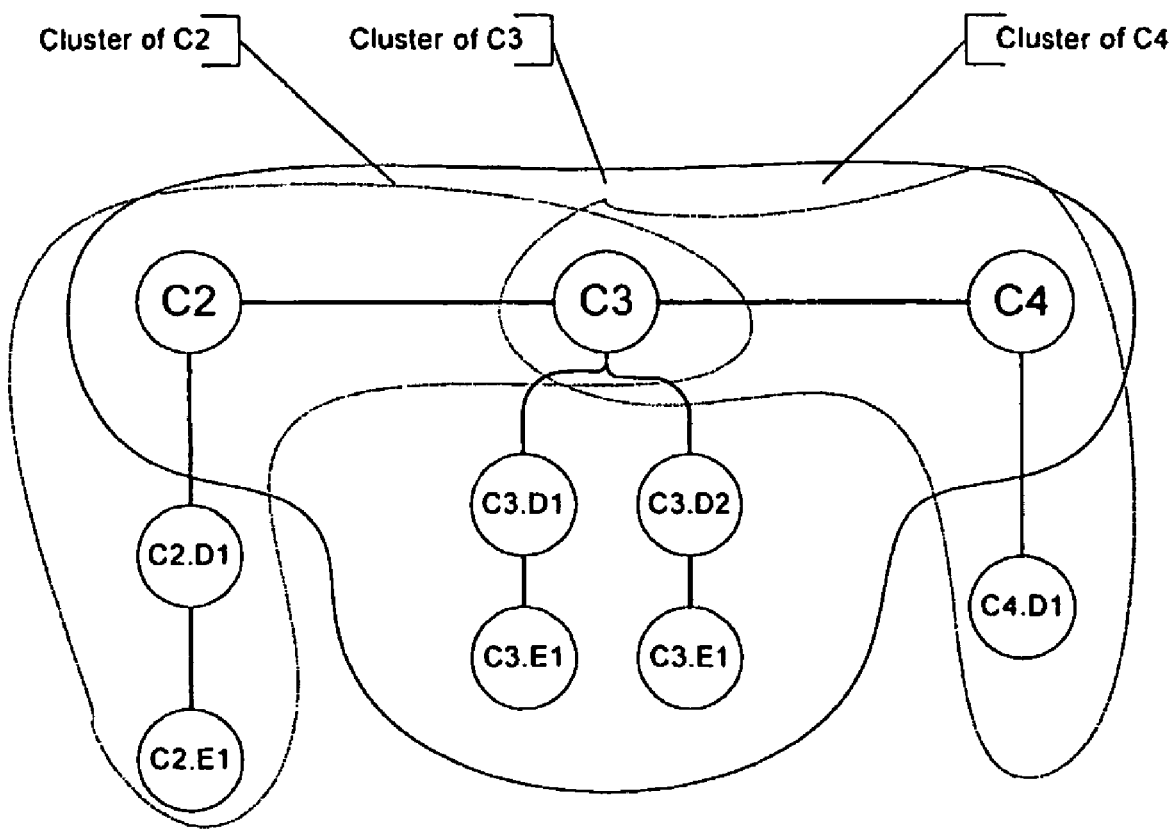
FIG. 11 illustrates an example of a more complex cluster structure with subcomponents.

Very often the clustering will be much more complex, involving different categories of components, which are not all model chained. As a simple extension of the previous example, consider if the components above have two subcomponents with one subcomponent each. The parent component's model depends on all its subcomponents, but neither of these is depending on anything in clusters of C2 and C4 (see FIG. 11).

The instant product model compromises the dynamical product model, and includes a set of PM-fragments build together. In other words, the instant PM is the sum of its PM-fragments in a unique combination depending on each other.

Notice, that the instant PM normally includes many PM-fragments of the same category, where PM-fragments of the same category is defined as PM-fragments with the same set of parameters, but where the parameters may have different values.

Model merging is what happens when an instant PM is changed dynamically by adding a new PM-fragment to a given instant PM or when connecting two or more components. In the first case, the present instant PM is extended with a new fragment. In the other case, merging of the instant PMs of each of the component is performed. However, In practice on the local level the processes are the same, thus the unified wording.

Model merging can be done in two ways. One way is within a cluster joining the PM-fragments; however, this just assembles one complete local PM, i.e. a new PM-fragment, in the cluster. The other way is between clusters, which is the real model chaining seen from the point of view of general configuration.

A good way to look at an instant PM is as an (unlimited) number of overlapping classical product models, each of which can be semi-independently configured, except as they impact their overlaps by model merging.

A single component can be considered an instance of a component category. Upon creating a component a new copy of all the parameters is created. Upon adding the component to the scene, all these parameters are added to the total instantaneous parameter space of the instant PM, and those constraints, which only involve that component, are applied.

When two components are connected, each plays a particular role towards each other. These roles are predefined (with behavior and all) in the component category and the behavior is part of product model.

The behavior can be seen as consisting of two parts. First part is a description of which roles are available and which component categories can play them. The component variable represents each role available to a component. There is then a domain, as well as the optional constraints assigned to this variable. Second part is a description of how the two local PMs associated with these components affect each other. They affect each other by putting constraints on each other's state variables, i.e. they do not affect which variables are actually available in the components, while they do affect which values are legal in those variables.

In this context, the instant PM comprises:
A parameter space, which is a Cartesian product of domains associated with individual parameters (state variables).
A legal subset of the parameter space, which defines relationships between the parameters values.

An equally valid way of looking at this is that the instant PM comprises relationships between the values of these parameters, defining a subset of the parameter space, which is called legal. Such relationships are also called constraints.

The instant PM may change dynamically, in the following manner. What may change is:
The parameters, which are included in the parameter space. Note that the domain of a given parameter may not change.
The subset of the parameter space, which is called legal. Note that by definition a subset belongs to the superset, so changing the parameter space a priori renders the subset invalid. However, if defining extensions of the superset by just adding to the legal subset, and restrictions as the obvious restrictions of the subset, this is still well defined.

Figure 12:
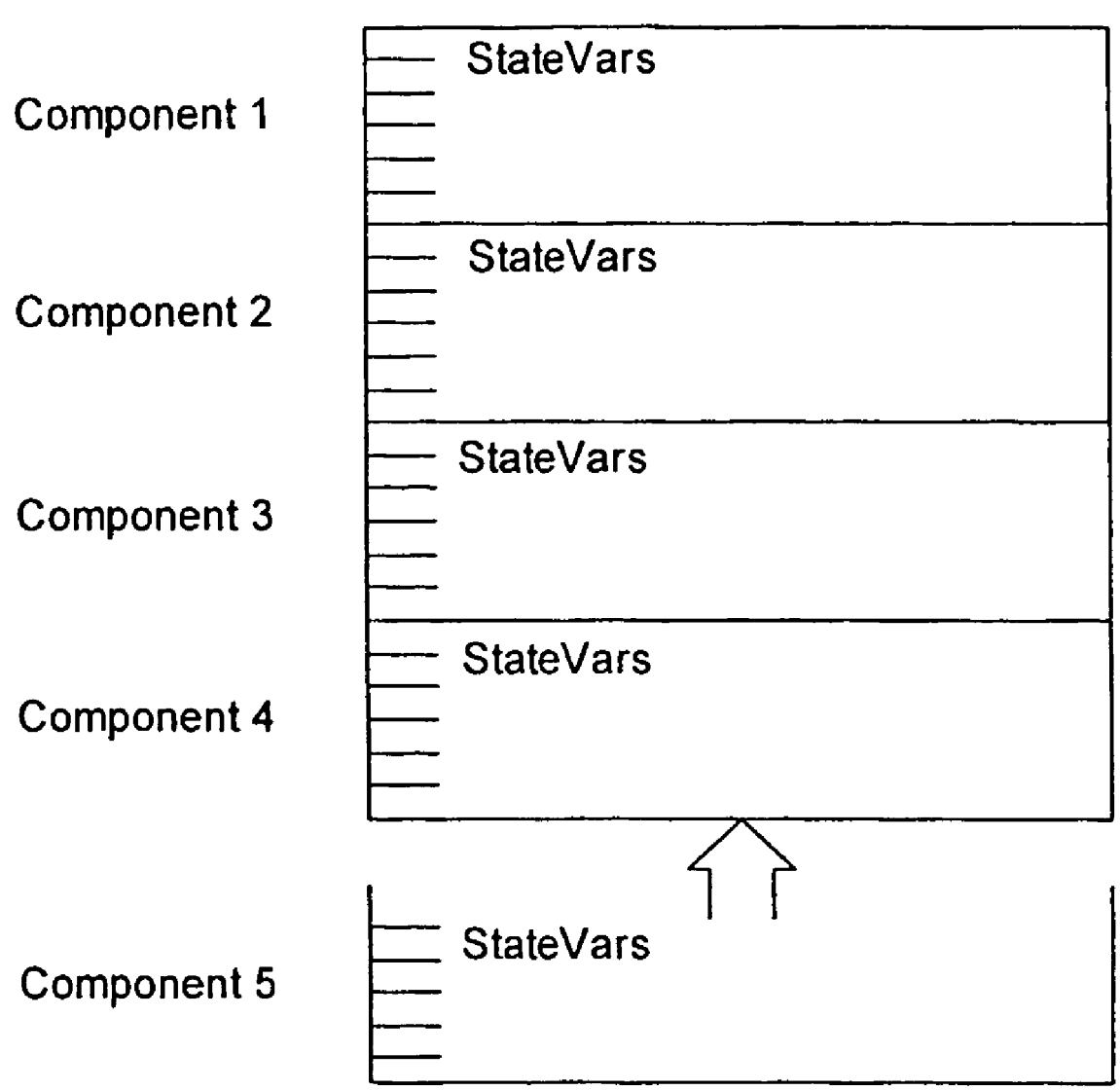
FIG. 12 illustrates adding a component (component 5), which extends the parameter space.
Figure 13:
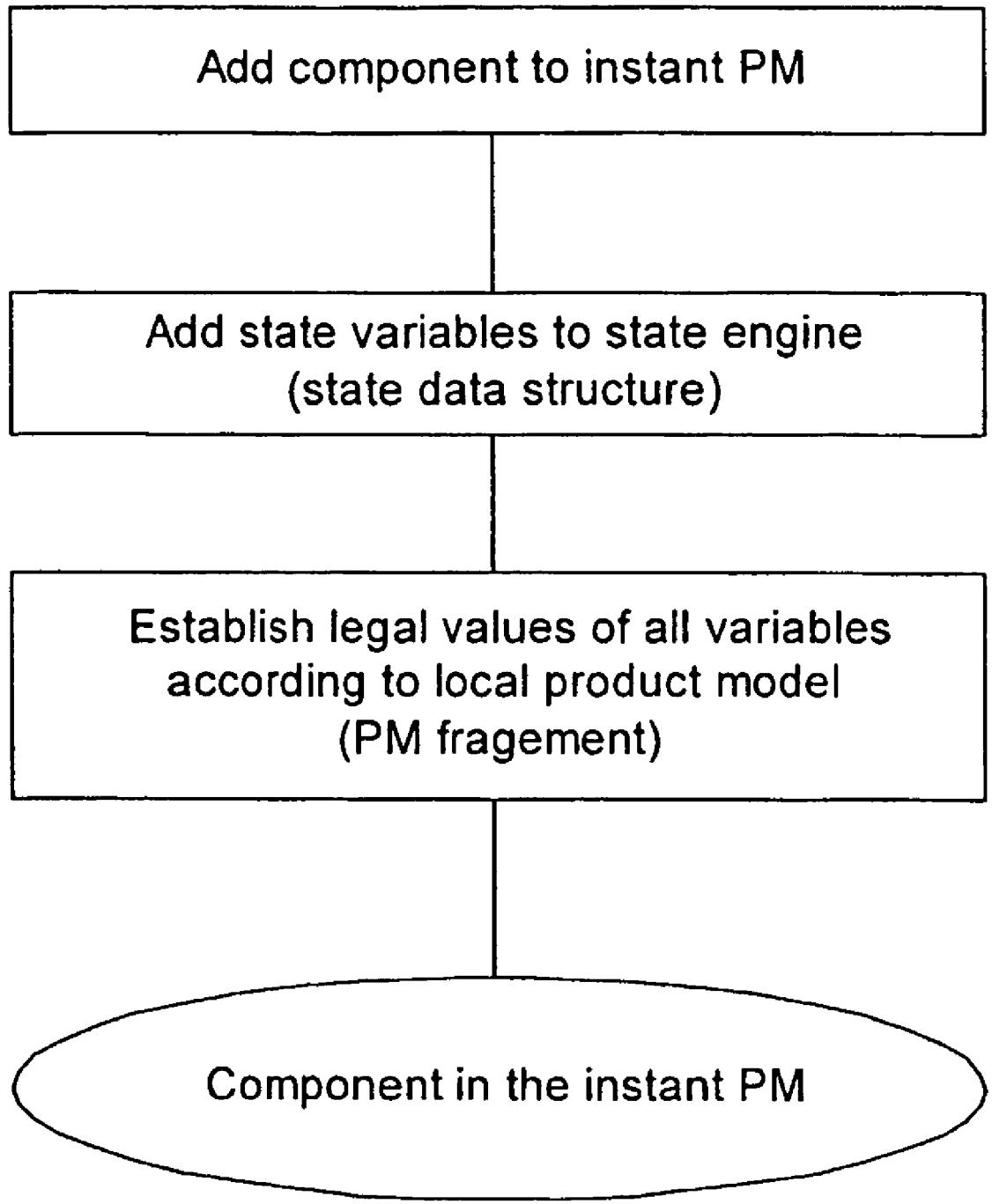
FIG. 13 illustrates the process of adding a component to the instant product model.

The instant PM (in the configurator) essentially changes when amending a component, when adding or removing a PM-fragment (or component), and when rearranging the connections between the PM-fragments in the corresponding component hierarchy. It can change in five ways by
amending a component
adding a new component,
removing a component,
connecting two components,
and disconnecting two components as explained in the following. The operation of amending a component only has local effect on the parameters of the component. The operation of adding a new component, extends the parameter space by adding the parameters of the new component, see FIG. 12. Furthermore, this subset may be constrained internally, but there can be no relationships between these new parameters and the old ones. The process of adding a component to the instant PM is shown in FIG. 13.

The operation of removing a component simply removes the parameter associated with this component from the parameter space of the instant PM. A pre-request is that the component to be removed is not connected, i.e. has been disconnected from all other components before.

Figure 14:
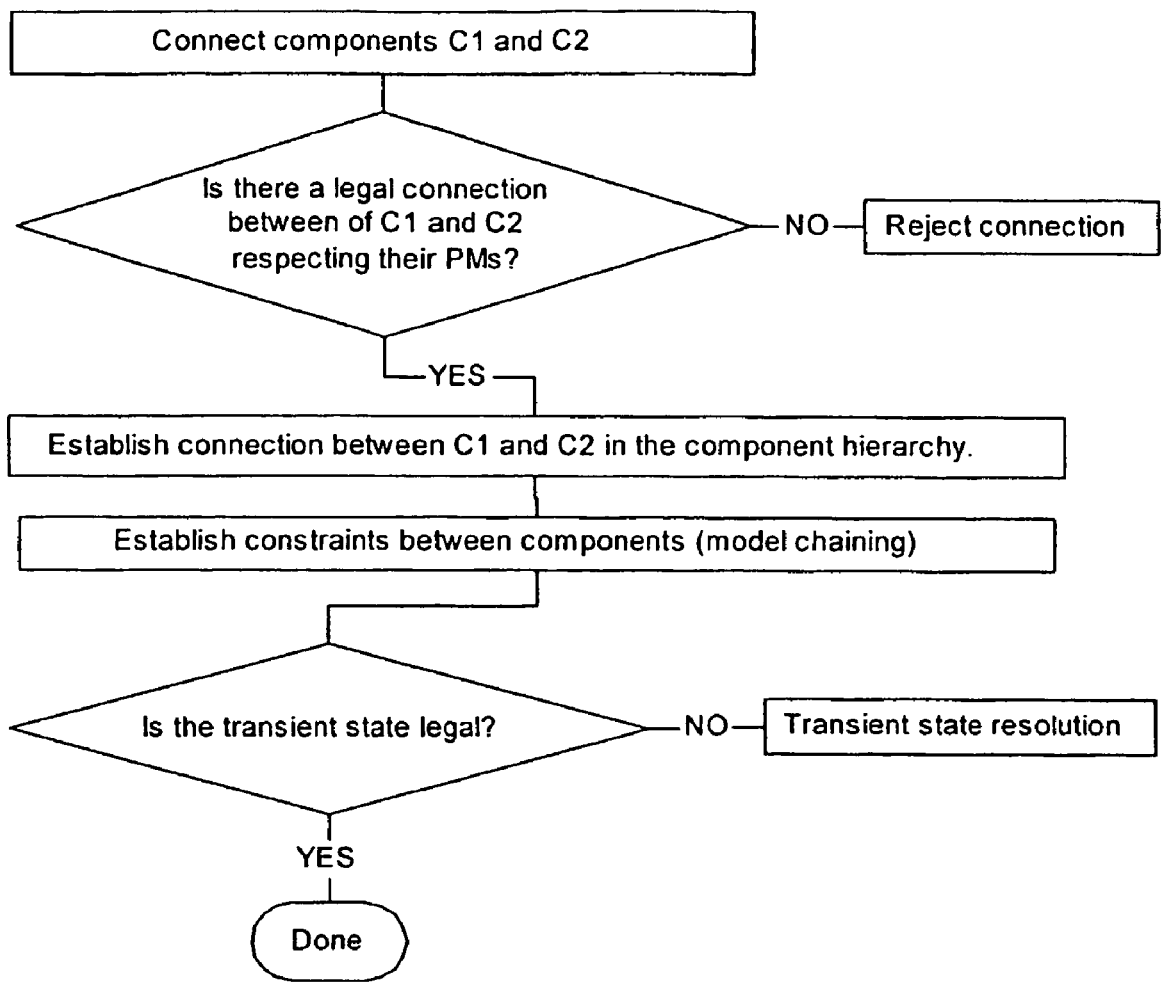
FIG. 14 shows the process of connection components.

The operation of connecting two components may change the legal subset. Directly by establishing new relationships between parameters belonging to each of the two components. Indirectly this may further have consequences on those parameters already established relationships. Concretely, the process involves establishing model chaining between the local PMs of the two components in question. This model chaining depends on, which particular roles the components play towards each other and is described as part of the PM-fragments (component categories), see FIG. 14.

One way to implement the process of connecting two components involves making each of the components play a particular role towards the other, and setting up the model chaining between the two components. This model chaining consists of establishing a chain or more chains between elements belonging to the two local PM-fragments of the components (see FIG. 15). These chains are associated with the particular roles, and are part of the PM-fragment.

Obviously, the operation of disconnecting two components requires that these two components be connected. This operation changes the legal subset by disconnecting all relationships between parameters belonging to these components.

A componentized PM consists of two PM-related parts. One part is the static description of the PM called the fragmentized PM, which consists of a finite number of PM-fragments. The other part is the instant PM described above, which is changed dynamically in a run-time environment.

These two parts are important to separate, since the fragmentized PM is use for getting a structure of building blocks of a system or product before it is build together, whereas the instant PM is used in the build process, where each PM-fragment from the fragmentized PM is used in generating the instant PM.

A very important effect of connecting two components, and establishing model chaining as described, is that this merges the two PMs, and thus changes both in the model merging process. In principle, seen as a standard configurator, this renders the whole configuration, which satisfies the Instant PM from before the merge, invalid or even not meaningful. However, by the componentized PM based on the principle of component-centered state representation of the current configuration, it is ensured that the number of variables, their meaning, and the associated domains are unchanged ensuring the very important property that the resulting state still represents a meaningful (technically valid) configuration in the new, merged componentized PM.

This property described above is a very important property, but the states' legality here is not guaranteed. This state is a transient state, since the illegalities need to be resolved, and in this case pure rollback would not be appropriate, since this would correspond to breaking the connection again. This is called transient resolution, and there are a several possibilities. Note that even though in principle all variables may have become illegal, by the locality principles naturally build into the component-centered representation (e.g. both geometric and structural locality) usually the problems would be confined to the neighborhood of the involved components, and very often just a very few variables, if any at all.

The strategy to solve transient resolution based on componentized PM, is to find an acceptable state nearby in the parameter space. How to measure the term nearby depends on the PM, and can in fact be considered part of the componentized PM. This could for instance be assigning a priority to all variables and change the least important ones in conflict first until a legal state is reached. Other strategies are possible.

In principle, a component variable is just an ordinary variable, which can have constraints in the normal fashion. However, since setting such a variable actually cause a model merging implying that the rules changes during the value setting process, where it have to be coordinated in the PM on both sides before the merging, and to prevent a too extensive transient resolution, plug technology is employed. Plug technology pre-ensures some compatibility between the connected PMs. Plugs, basically, represent connection points in the components, and by associating with the component variables, they control if connections make sense, before the PMs are merged. A further benefit is that this Is a natural way of providing geometric and visual representation with necessary positioning data.

EXAMPLE OF A COMPONENT-BASED VISUAL CONFIGURATOR

The invention gives a method for configuring a virtual representation of physical objects in a component-based visual configurator based on the principle that a product and thus the product model can be infinitely build from subproducts (or product parts). The componentized product model is used as a fundamental mechanism in the component-based visual configurator, in short: The visual configurator. This visual configurator is made for a type of products typically hard to handle with a standard configurator, and on the other hand commonly occurring. Conceptually, it is binding together the following 5 key points;
1. employing a component hierarchy and
2. a state engine, which is a particular implementation of the state representation,
3. binding to it a dynamic, true visual representation of the current configuration,
4. and satisfying both logic constraints
5. and geometric constraints.

Figure 16:
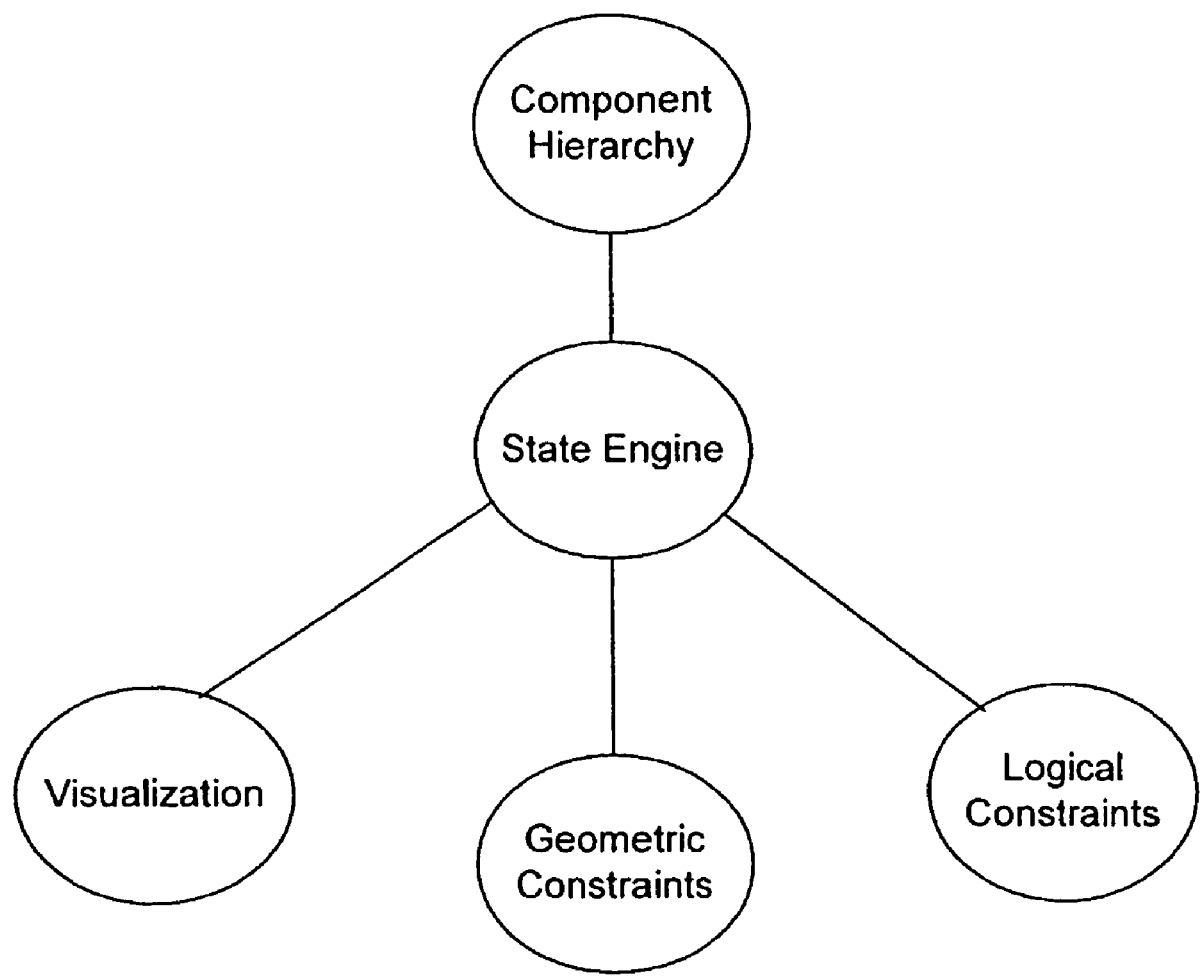
FIG. 16 illustrates the architecture of a component-based visual configurator, FIG. 17 contains a drawing of data-structures of manager, world, components etc.

The basic architecture of a component-based visual configurator is shown in FIG. 16. The description below is concentrated on the overall data structure selected, which set into perspective with the data structures described earlier, together with particular implementation choices in relation to state variable process timing done by the state engine, and the working and association of constraints in connection with the state variables.

The basic structure multitude of components connected in a graph structure (not necessarily a single connection group). Each component is assigned a state vector; comprising one state variable for each of the components parameters. This constitutes a complete representation of the (dynamic) parameter space.

The visualization is added by assigning the world some surroundings (the visual world), assigning each component a visual representation, and allowing each state variable of a component to have a visual effect, changing the components representation (including its position relative to the world or other components). Since each state variable has exactly one value at all times the complete visualization of the entire product exactly shows the current configuration at all times.

The rules determining the legal part of the parameter space, are modeled by assigning constraints to each state variables. In this implementation two particular types of such constraints are used. One is a purely geometric representation of the world and product, which allows the use of constraints representing geometric properties of the product. The geometric rules are added similarly to the visualization, by assigning the world some geometric world, allowing each component a geometric representation, and allowing each state variable a geometric constraint. The component structure is reflected in the fact that each connection between components encompasses a relative position between them.

Second type is a normal logic configurator, which collect a purely logic representation of the product. There is associated such one for each local PM-fragment, which is associated with a certain category of component called logic cluster holder, depending on the particular PM, this could in principle be every component. In particular state variables are bound together by assigning them logic constraints associated with some logical description of relations between the variables. In this implementation each component is allowed to be associated with such one, and each state variables may be assigned a logic constraint binding it to one (see more details on how this relates to the concepts of local product model, logic cluster and cluster holder below).

First of all, the full application comprises a core containing the above (and below) described methods and structures, together with a 3D renderer (any device), a graphical user-interface, possibly an external logic configurator, and a representation of the PM in question.

The basic application structure is build up of a number of controllers, basically, an overall manager to bind everything together and handle initialization, a data-manager to control the static fragmentized PM and associated information (data), a visual controller to handle the 3D visualization, which interfaces with an external visualization system, and a geometry controller to handle the geometric world.

Figure 17:
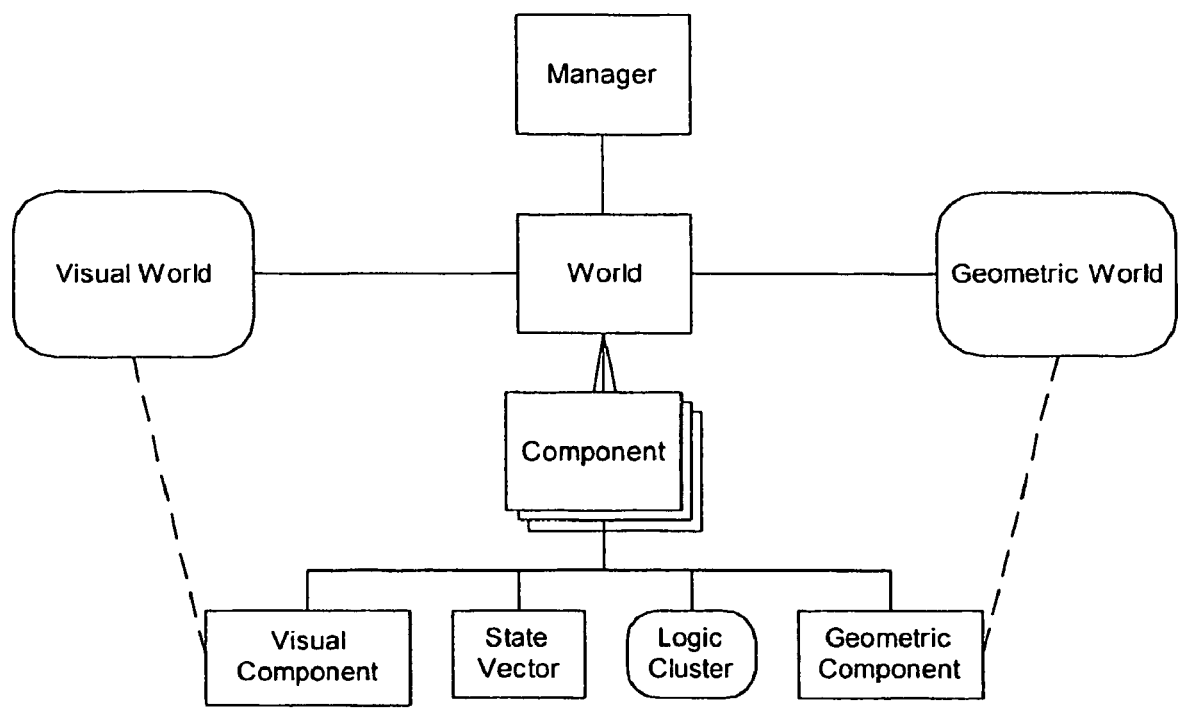

The overall data structure (apart from specialized ones in each of the above) is build up around the multiple components. There is a world, which essentially represents the surroundings, i.e. the scene in which the product is build. It contains the components, which may be directly inserted into it, but not the component hierarchy directly. Only some initially components are directly inserted into the world, while subcomponents for instance may be connected to another component, and thus only indirectly inserted. This data structure is sketched in FIG. 17.

The next three examples describe the three parts under the state engine in FIG. 16.

EXAMPLE OF THE VISUALIZATION PART

To maintain a true visualization of the current (full) configuration (state of the product), the following practical aspects have to be taken into consideration.

First of all, a visual scene is associated through the visual controller to the world object represented, for example by some 3D-scene graph. This also contains the product surroundings, which may again have its own parameters and can in fact be configured separately. This distinction is made, since it will usually just influence the product or the PM (rules), instead of actually being a part of the product. Sometimes it may even be changed visually just to show the actual configuration in right or correct surroundings.

Secondly, each component can be assigned a visual representation. Non-visual components are referred to as ghost components or abstract components, and usually have some collecting role.

Thirdly, each state variable may have a visual effect, which influences a specific aspect of that representation. It might in fact just exchange the entire representation with another depending on the flexibility of the visualization system.

A possible type of visualization systems is one where the representation is build on a scene graph or even a 3D scene graph. In such a system, the visual effect of one variable of a component will be to make changes to a particular visual node. For instance changing the color-field of a material node may change the color of an item, while changing the shape node may change the actual shape of it. Changing the translation or rotation field of a transform node further up the graph will change the position of the item, i.e. move the component.

This hierarchical representation is particularly well suited to exploit the benefits of the componentized representation in use. It makes it natural and easy to contain visual changes locally, i.e. within a component or just between two connected components. For instance, two components can be visually bound together in a connection, independently of other component, and without affecting relations to other components. Again the point of component-based visual configuration is that consequences (and effects) can be effectuated locally. In other words, on the components own visual representation and the positions of connections to other components.

EXAMPLE OF CONSTRAINTS IN A GEOMETRIC CONFIGURATOR

An important part of a visual configurator describing physical objects is the ability to describe geometric and physical aspects of the product, and relate these aspects to the configurator, i.e. the state variables.

Similarly to the visualization, the idea essentially is to maintain a geometric representation of the current (full) configuration. Thus, It is possible to assign constraints to a state variable, which can query the current geometric representation, and also change it, which normally implies an effect.

Again, each component can be assigned a geometric representation determined (its shape), which is inserted in the geometric world when the component is added to the current configuration. Each variable can be assigned a geometric constraint, which for instance could prevent a component to be moved on top of another, i.e. collision prevention, or perhaps ensure that nothing enters a particular zone associated with a component. An example of a zone is a safety zone or a working zone. It could also just be having some slots which can be occupied or not, and thus prevent or allow components needing a particular set of slots from being inserted or connected.

The concept of geometric constraints is particularly important for the configurator, in that via the geometric world there can be given sense to concepts like distance between components, which can actually be measured and employ in other rules, e.g. logic ones. This is not data usually available to a classic configurator, which makes certain types of rules hard to formulate. Also it gives a natural concept of local influence (locality or nearness) totally apart from the structural one (of the component structure and component hierarchy), which for instance allows a very simple way of noticing or sensing when subproducts have been added and/or build to meet again. This way of formulating geometric rules is a key mechanism of the componentized PM.

Notice that all geometric constraints are associated to the same geometric world, meaning their respective state variables are here influencing each other totally independently of whether they can access the same state vector, i.e. locally with respect to the component structure. Instead, being of a geometrical nature, a constraint on a component is only influenced by others, which are physically near the component. Hence, there is a different concept of geometric locality here, which beautifully complements the structural one.

EXAMPLE OF LOGIC CONSTRAINTS IN A COMPONENTIZED CONFIGURATOR

A range of problems is solved in combining logic configuration with the concepts of componentized configuration, and thus exploits the power of a logic configurator in the componentized environment. In other words, this environment enhances the logic configurator and vice versa, if used right.

Essentially, the data structure is extended by being allowed to associate a logic configurator (logic-database) to each component (state vector actually), containing logical rules, and assigning logic constraints of this database to state variables in the component. This allows these variables to become inter-dependent in a complex way (dependent on the complexity allowed in the logic-database).

Figure 18:
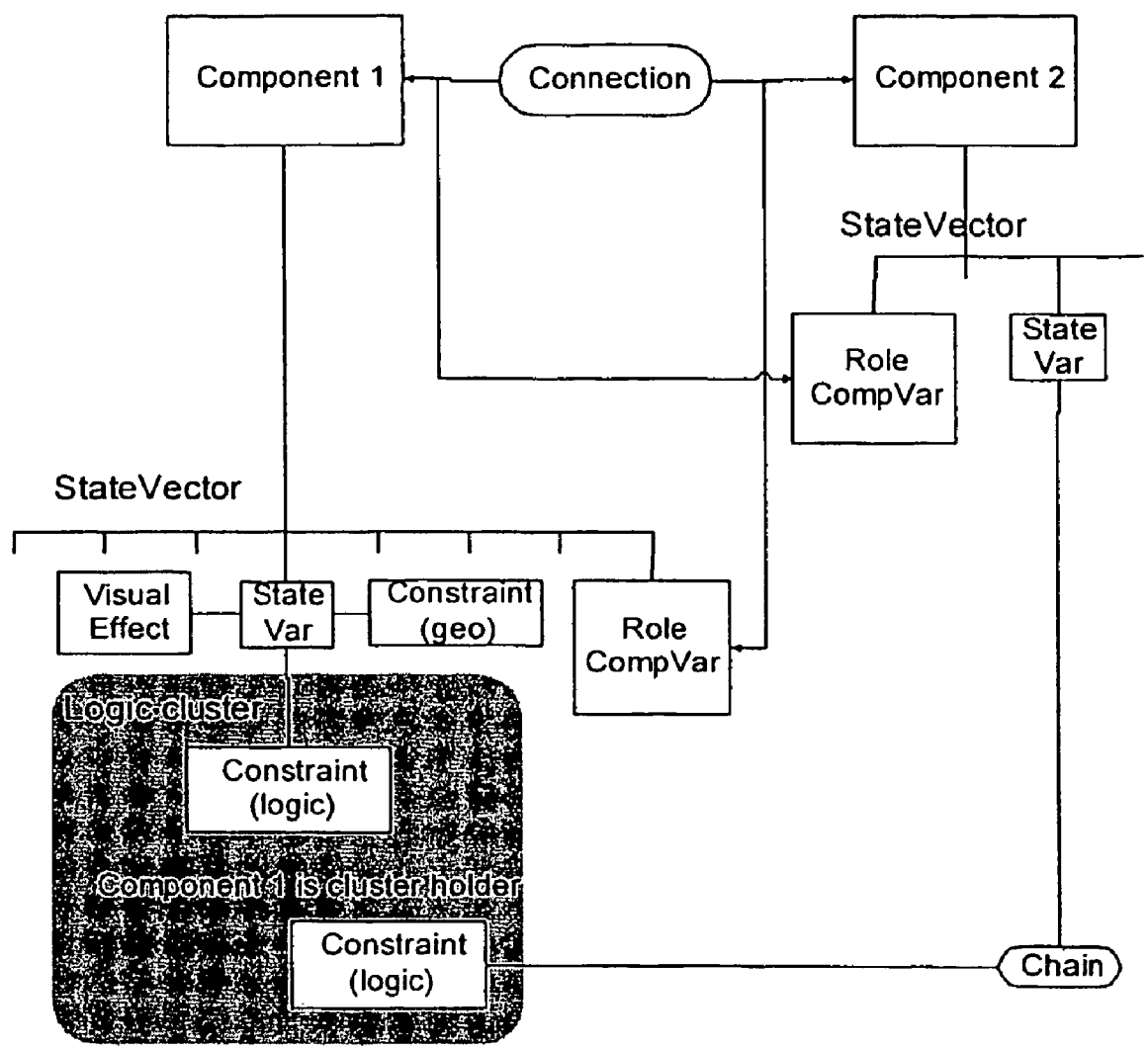
FIG. 18 shows a logic cluster of component 1.

By using the chaining mechanism, state variables in connected components can also be assigned logic constraint from the same logic-database, and thus encompassing them in the corresponding local product model. In this situation, the multitude of variables, which have been assigned logic constraints from this database, is called the logic cluster of the component with the associated logic-database. This component is then called the logic cluster holder (see FIG. 18). Note that this structure allows the configurator to exploit the strength of any logic configurator. In the componentized configurator the local product models describes a predetermined number of parameters, while the entire, instant product model may comprise any number of local product models and thus any number of parameters.

EXAMPLE OF A VISUAL CONFIGURATOR FOR A SCAFFOLDING SYSTEM

The purpose of this example is to illustrate the configuration process using the methods of the present invention. The component structure and data structure of input data used in the configurator is emphasized, and how the componentization of the product model (PM) captures the extendable nature of a so-called buildable product.

The example is a scaffolding system. Two aspects are examined, namely the modeling process, where the structure, parameters and rules of the system is captured, and the configuration process, where a particular scaffold is configured, exploiting and respecting the limitations of the scaffolding system.

The scaffold configurator could for instance be offered by a scaffold-system manufacturer, as a service for scaffolders, who can use the system to configure exactly the scaffold they need for a particular task, while ensuring that the manufacturer can actually deliver such a (customized) system. Using the visualization-system associated with the configurator, i.e. a visual configurator, this will be very easy for the scaffolder to assembly correctly.

The product consists of an entire system for building scaffolds. It comprises a number of sub-scaffolding items, such as floor modules, rails, ladders etc. These are denoted components In the product model and (physical) objects in the sub-product context. Recall that a product model also can contain abstract components, and that these do not necessarily correspond one-to-one to physical objects.

In more details, the scaffolding system in mind is a system for setting up a working platform up along the side of some building. Essentially, it consists of a number of floor platforms mounted on a frame structure of steel tubes. To facilitate going up and down some floors can have holes with ladders mounted. To protect workers from falling, rails of steel tubes can be mounted on the frames as well. Finally, (and not modeled here) the frame can be attached to the wall of the building to fixate It.

A scaffold is essentially build from a number of floor modules, comprising both platform and the necessary frame. There are two types of platforms, one standard and one with a hole and ladder mounted. The platform is rectangular with a short side and a wide side, and the scaffold can be build out from floor modules by connecting other floor modules to either side (equal lengths required) or on top or below.

Usually, one of the two wide sides of a module will be the wall mount and is called the inside-side. Below a module there have to be either ground or another module. The distance from one floor module to the next above can be low, medium or high (and a possible ladder from a hole has to abide by this height). A given scaffold (one configuration) is divided into stories, so platforms next to each other have the same height.

There are two types of rails, a short and a wide, fitting with the sides of the floor module. To allow adding rails on the top-most floor it is possible to add a top module, essentially consisting of some longer tubes.

The particular system of scaffold has a PM comprising the following components; platform, rail standard, rail full, top and ladder with relations as described above. Below is specified the parameters of each type of component, and a formulation of them as variables according to the componentized PM. Moreover, the chaining involved between different connections is formulated. Thirdly, sketched are the constraints involved defined as associated to a rules database (here named rules.logicdb), and sketch the type of rule involved.

There are two types of floor modules, one standard and one with a hole and ladder mounted. These correspond to one (platform) component in the PM, which can either. have or not have a hole in either side of the floor. Notice that if it can only have hole in one end the orientation matters. On the other hand, there cannot be two holes. The platform component is the key component in this product model, which collects the rules and parameters of the scaffold system.

TABLE 1

The platform component

```
<Component id=platform . . .
    <variables>
        <var id=neighbor_left domain=modules valuetype=component type=link . . .
        <var id=neighbor_right . . .
        <var id=neighbor_outside domain=modules type=link . . .
        <var id=inside_neighbor . . .
        <var id=above domain=modules_and_top type=link
            . . . here should be a chain if the module comprised different 'shapes' of modules,
            . . . eg wide and narrow
        <var id=below . . .
        <var id=ladder valuetype=component type=sub . . .
            <chain id=resize direction=out constraint=ladder chained=length/>
        </var>
        <var id=rail_left domain=rails type=sub
            <chain id="length" direction="out" constraint="rail_left_length" chained="length"/>
        </var>
        <var id=rail_right domain=rails type=sub . . .
            . . .
        <var id=rail_outside domain=rails type=sub . . .
            . . .
        <var id=rail_inside domain=rails type=sub . . .
            . . .
        <var id=wall_inside valuetype=boolean default=true
        <var id=height valuetype=integer domain=module_heights default=medium
        <var id=hole valuetype=boolean visualeffect=switch
    </variables>
    <logic>
        . . .
    </logic>
    <geometry>
        . . .
    </geometry>
</Component>
```

TABLE 2

The rail standard component

```
<Component id=rail_standard
    <var id=length domain=side_lengths
</Component>
```

TABLE 3

The full rail component

```
<Component id=rail_full
    <var id=length domain=side_lengths
</Component>
```

TABLE 4

The top component

```
<Component id=top . . .
    <var id=rail_left domain=rails type=sub
    <var id=rail_right domain=rails type=sub
    <var id=rail_outside domain=rails type=sub
    <var id=rail_inside domain=rails type=sub
    <var id=wall_inside valuetype=boolean
</component>
```

TABLE 5

The ladder component

```
<Component id=ladder
    <var id=length domain=module_heigths effect=switch
</Component>
```

TABLE 6

The domains of the variables

```
<domain id=modules           list=(platform,none)/>
<domain id=modules_and_top  list=(platform,top_module,none)/>
<domain id=rails             list=(rail_standard, rail_full, none)/>
<domain id=module_heights   list=(low, medium, high)/>
<domain id=side_lengths     list=(short, wide)/>
```

The following rules are used to describe the product model:

Rule 1. The connection points of two modules have to be of the same length, i.e. if C 1 have C2 as left_neighbor, then C2 has to have C1 as either right_neighbor or left_neighbor, and furthermore, it has to be right because otherwise the inside-sides would not correspond.

Rule 2. There can be no inside neighbor if there is a wall.

Rule 3. If a floor is not on the ground there have to be another floor below.

Rule 4. There can only be a ladder if there is a hole.

Rule 5. If the floor is not on the ground there have to be a rail on a floors side, if there is no neighbor (or wall if inside).

Rule 6. As a consequence of rule 5 there has to be something on top of every floor component (recall the tubing goes down from the platform).

Rule 7. Similarly to rule 1, the length variable of the rail has to correspond to the length of the floor side.

Rule 8. A ladder's length has to fit with the modules' height

Rule 9. The height of all the floors neighbors (not above and below) must be the same.

Rule 10. No collision of objects or collision with the surroundings, for instance a part of the building.

Rule 11. The geometry of a ladder and rail has to fit with the length (and only if there is no collision).

Rule 1 is essentially a structural constraint of coordinating which roles two components in a connection each play. This is implemented using plugs making the constraint implicit.

TABLE 7

Connecting of modules using plug constraints

```
<var id=neighbor_left plugid=neighbor_left . . .
    <plug id=neighbor_left type=floor_short . . .
        . . .
```

Rule 2, rule 3 and rule 4 are standard logic-type constraint binding variables within a component together. Each of the variables is associated with a constraint, thus binding it to a logic data-structure (rules.logicdb), which can be formulated separately.

TABLE 8

Logic-type constraints associated to a rules
database named rules.logicdb

```
<var id=neighbor_inside logicconstraint=neighbor_inside . . .
<var id=wall logiccconstraint=wall . . .
    . . .
```

TABLE 8-continued

Logic-type constraints associated to a rules
database named rules.logicdb

```
<logic database=rules.logicdb . . .
    <constraint id=neighbor_inside
    <constraint id=ladder
    <constraint id=wall
    <constraint id=below
</logic>
```

In the separate data structure rules.logicdb, the rules are formulate logically:

TABLE 9

Logical rules, where -> means implies

```
wall=true -> inside=none
hole=false -> ladder=none
onground=false -> below=floor_module
```

Rule 5 and rule 6 are similar to rule 2, rule 3 and rule 4, except that it is very impractical to enforce these rules during the building process. For instance, the empty side is a necessary pre-state to add another floor-module. This type of rules is called a complete rule or finalize rule, and is only enforced by the system if explicitly asked to complete. When enforced the configurator yields a final and correct scaffold.

TABLE 10

Logical rules, where ! means not

```
in_complete -> (neighbor_left=none and !ground) -> rail_left !=none
in_complete -> (neighbor_outside=none and !ground) ->
rail_outside!=none
    . . .
in_complete -> above!=none
```

Rule 7 and rule 8 are also standard logic-type constraints, except they involve variables in different connected components. Since logic constraints are held by one component it is necessary to push the constraints from the floor-module onto the variables of respectively rail and ladder through the chaining mechanism.

TABLE 11

Relation between chains, logic and components

```
<component id=floor_module
    <var id=rail_outside . . .
        <chain id=length constraint=rail_outside.length
    </var>
    <logic database=rules.logicdb>
        <constraint id=rail_outside.length . . .
    </logic>
</component>
<component id=rail . . .
    <var id=parent
        <chain chaintype=constraint
    <var id=length
    . . . and in 'rules.logicdb'
    rail_outside!=none -> rail_outside.length=wide
    rail_left!=none -> rail_left.length=narrow
    . . .
    ladder.length=platform.height
```

Rule 9 is equal type constraints between connected components. This can be handled directly through the chaining mechanism

TABLE 12

Chaining mechanism

```
<var id=neighbor_left domain=modules valuetype=component
type=link . . .
   <chain id=n_height direction=in chained=myheight
   constraint=neighbor_left.height
   <chain id=myheight direction=out chained=n_height refvar=height
   . . . or . . .
   <chain id=myheight direction=out chained=n_height constraint=height
</var>
<logic database=rules.logicdb>
   <constraint id=neighbor_left.height
and in 'rules.logicdb' add
platform.height=neighbor_left.height
platform.height=neighbor_outside.height
   . . .
```

Rule 10 and rule 11 are typical collision-type constraints. Rule 10 is implicit formulated on all component variables by assigning geometry to the components. For example,

TABLE 13

Collision geometry on a component

```
<component id=rail . . .
   <geometry>
      <box size= . . .. position=. . ..
   </geometry>
```

Rule 11 involves telling the geometric data-structure that the geometry of a component changes (and checks whether this is allowable). This is typical geometric constraint.

TABLE 14

Geometric constraint on a component

```
<component id=rail . . .
   <var id=length geometricconstraint=length . . .
   . . .
   <geometry>
      <constraint id=length type=geometrychange . . .
   </geometry>
   . . .
</component>
```

In the following is given an example of how to configure a scaffold in a componentized configuration system using the componentized product model defined above. The focus is twofold; first to show the process and how a user can exploit the benefits of this way of configuring a product. Second to give show what actually happens within the configurator during the configuration process.

Figure 19:
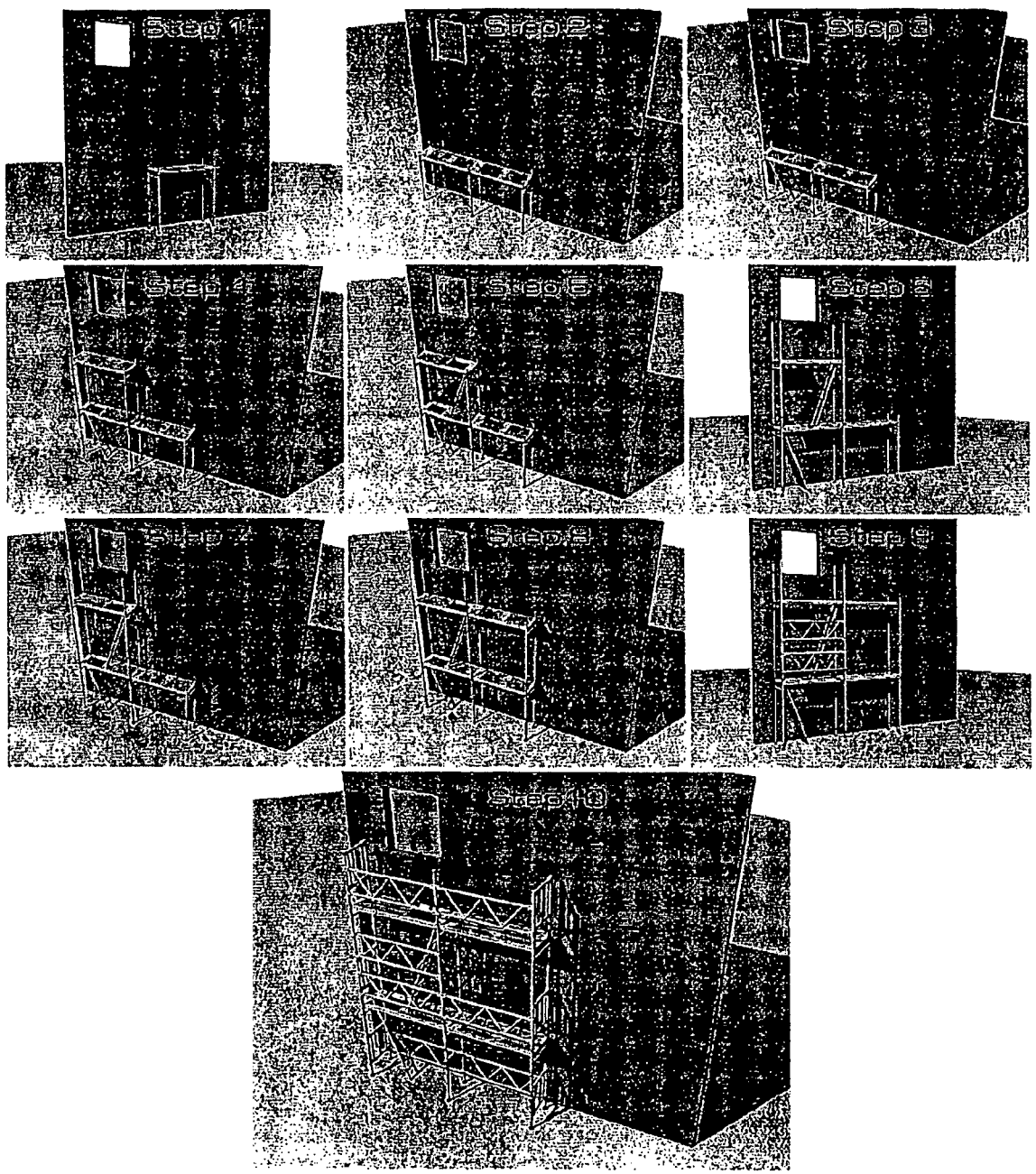
FIG. 19 shows a visualization of the steps in configuring a scaffolding system.

The target configuration is a scaffold in two floored levels for instance to reach a particular window needing some outside renovation, with ladders in one side, giving a 2 ×2 scaffold with extra top modules on both. The user takes the following steps and the corresponding visualization of each step is illustrated in FIG. 19:

Step 1: The only component available for direct insertion into the world is the platform, so the user selects and inserts a platform. It comes in the default height medium. It is automatically named platform1.

Step 2: The user selects the left_side of platform1 accessing the two variables neighbor_left and rail_left. One can add either a platform or a rail. The user adds the platform, which is named platform2.

Step 3: The user selects platform2 and set the variable hole to true. The configuration system will automatically add a ladder (downwards) at the hole (ladder1), and sets its length to medium.

Step 4: Now select the top of platform2. One can add either a platform or a top module. The user adds the platform (named platform3).

Step 5: The user sets the variable hole to true in platform3, automatically adding ladder2.

Step 6: Selecting the top and add a top (top1).

Step 7: Noticing the top floor is not high enough to reach the window, and the user selects platform3 and adjusts the variable height to high. The length of ladder2 is automatically set to the value high too.

Step 8: Select the top of platforms, and the user can add another platform (platform4). This is noted by the geometric world, and the system automatically set platform4 as neighbor_right to platform3. It subsequently adjusts its height variable to the value high.

Step 9: To have optimal protection of workers climbing the ladders, the user selects the outside of platform3 and set outside_rail to the value full. It comes in with length variable equal to the value wide.

Step 10: Finally, to ensure railing all necessary places the process complete is enforced by the user. The configuration system adds single rails to platform3 via the state variable rail_left, platform4 via rail_right and rail_outside and top1 via rail_left and rail_outside, adds a top (top2) to platform4.above, adds single rails to top2 rail_right and rail_outside. Note that by default the inside of both platform and top is along wall, so nothing is added there.

What actually happens within the configurator during the configuration process is discussed in the following focusing on the instantaneous PM, the state, the cluster-concept, and the rollback-mechanism.

Figure 21:
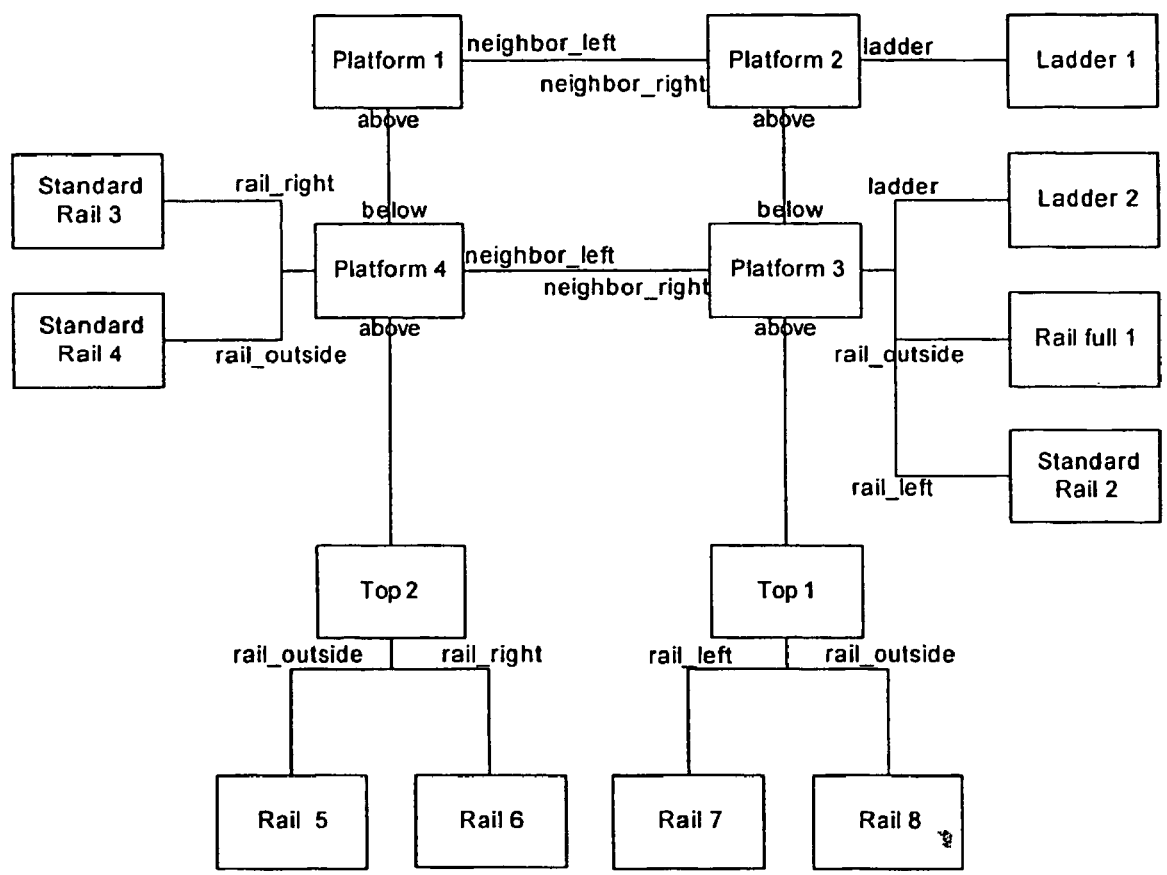
FIG. 21 shows the assembly (or component hierarchy) as it appears after step 10 of the configuration process.

Recall that the instant PM is a model of the currently assembled configuration of components, representing all the possible changes one can perform on the (current) state. It comprises the current component hierarchy describing how the components are assembled, and it comprises the current state space describing the collection of all state variables and their possible values. In FIG. 21 is shown the complete component hierarchy after step 10 is completed. In addition, recall that the state represents uniquely the current configuration, in the sense that it represents exactly one point within the current state space, and the current instant PM is reproducible from the state together with the (data of the) static fragmentized PM.

The state is exactly the collection of the values of all the state variables, where some variables (the component variables) play a dual role, as their value is related to and defines a connection to another component, and their collected states defines the component hierarchy. Their value in this respect is not a state value, but an actual component. This is called their connection value. In FIG. 22 is shown a sketch of the state space after step 9 is completed, and the state at the same time (see also FIG. 12). Notice that all variables have a default value, so they cannot be without a value. Variables, which have no specified default will automatically select one as the default, in particular component variables have the value none as default.

Figure 20:
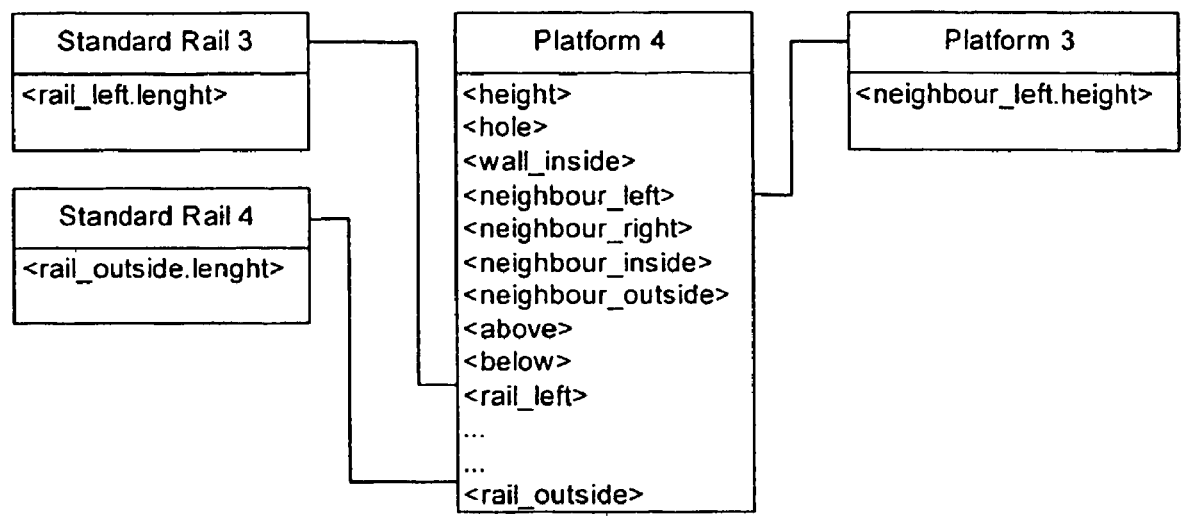
FIG. 20 shows a cluster of platform 4 including some of the variables involved.

Recall that the (logic-) cluster is the part of the instant PM, which is directly constrained by one logic structure. In this example only the platforms has a logic structure (rules) attached, so after all steps has been completed there are four (logic) clusters; one for each platform. See FIG. 20 for an illustration of the cluster of platform4 after step 10 has been completed. This figure illustrates the variables constrained by the logic structure attached to platform4 (platform4 is cluster holder). Notice that it includes some variables in other component, which are thus chained into the platform4 cluster. On FIG. 20 these are shown in separate boxes with lines going to the connection variable through which it is chained. Notice also that the variable neighbor_left.height is from platform3, which has its own cluster. This is an example of cluster overlap, where this information is needed both places.

Next is considered the process of setting a variable with a value. In step 3 the variable hole in platform2 is set to true. Usually, this works something like:
1) The user-interface accesses platform2 and obtains hole from it.
2) It asks for a list of legal values, which here is (true, false).
3) The user invokes the set value process on hole with the value true:
4) First the legality is checked and verified.
5) Secondly, the value is processed. This step includes updating the visual world to show the hole, and telling the logical data-structure of the new value.
6) Thirdly, the value is propagated. Here this involves finding possible consequences in the logical data-structure.
7) It discovers a simple conflict, namely with the other variable ladder, whose current value, none, is not among the presently legal values (ladder).
8) The state engine goes into resolving state.
9) To resolve the conflict the state engine invokes set value processing on the variable ladder with the value ladder.
10) When the ladder variable has successfully been set there are no more conflicts so the state engine goes to ready.
11) This set value process is finished successfully and notifies the user (-interface) of the new value.

Now is considered setting a component variable, i.e. creating a new connection. Above in step 9 the variable set was a component variable, so setting it has the side effect of actually creating a new component (ladder1), which is added to the instant PM, and connected to platform2. Normally, this works as follows:
1) Set variable ladder with value ladder.
2) Check if it is legal. It is.
3) Process the value. This invokes special effects for component variables.
4) Create a new component of type ladder. This becomes ladder1.
5) Initialize the state of ladder1. This consists of setting the sole variable length to the default value medium.
6) Connect it to the world (depending on the exact setup of the visual configurator)
7) Connect the chain resize to the variable length through the connector-variable ladder in the component platform2.
8) Check for conflicts in the ladder component. None found here.
9) Return from the connection process, and continue to the propagate value of the ladder variable in platform2, which checks for any conflicts. None found here either so the state engine can go into ready and return.

Finally, consider resolving conflicts. Notice in step 7 the configurator purposely changed the height of plaform2 yielding a conflict with the length of ladder1, which is then caught and resolved. A similar situation occurs in Step 3 and 5, which works as follows:
1) First the process check legality will find and tell that the value is illegal. The user has to explicitly override this (by listening to the abort-state of the variable and revoke it). In this case, the user-interface would do this automatically.
2) Secondly, the rollback-procedure should allow it to proceed. This will start the resolution procedure in the process propagate value.
3) By propagate value the conflict in the logic-cluster will be a reality. It will find that the variables height and ladder.length is in conflicting, and will find all possible resolutions, and finally compare them. In our example, the state engine selects changing ladder.length over height, since height's constraint has just been user-overridden. This could also have been done by setting the priority of height explicitly higher than ladder.length. In other cases, the user or surrounding application could be asked.

The invention claimed is:

1. A method for configuring, in a memory of a computer system, a virtual representation of an assembly of a plurality of components, the method comprising the steps of:
storing, in a database of the computer system, a first set of data representing a plurality of categories of components, and, for each category, parameters and constraints defining limitations for configurations of each of the components within each of the categories, whereby all components in a category have common parameters and constraints,
generating a second set of data representing the assembly of a plurality of components and representing a configuration space of said plurality of components, the second set of data comprising a separate data structure which defines valid combinations of components, the separate data structure being included in the second set of data in such a way that each separate data structure is associated with a particular component, whereby the constraints of the particular component reflects said valid combinations of components,
storing the second set of data in a memory of the computer system, the step of generating being performed while respecting the constraints associated with each component and constraints for the assembly,
generating a third set of data representing a present configuration in the configuration space, the step of generating the third set of data comprising offering a plurality of components or component categories,
repeating the steps of generating a second set of data and generating a third set of data by:
offering only such components which, when added to the assembly, result in a valid combination of components, the offered components being derived from the separate data structure of the second set of data,
adding, to the second and third set of data, data which represent one of the offered components and which are derived from the first set of data, or
deleting data representing a component of the second and third set of data, or
amending data representing a previously added component of the second and third set of data,
while respecting the constraints associated with each component and constraints for the assembly, so as to arrive at an updated version of the second set of data, and at an updated version of the third set of data, wherein at least one of the step of generating the second set of data and the third set of data comprises creating a set of clusters, each cluster containing data representing a single component as well as optionally at least one further component which is connected to said single component, whereby the set of clusters contains data representing all components comprised in the virtual representation.

2. A method according to claim 1, wherein data representing the plurality of components further comprise data representing parameters of the components, the method further comprising, at the step of generating the third set of data, offering a plurality of parameters of components, whereby only selected parameters are offered, the selected parameters being selected in accordance with constraints of components in such a way that only possible and/or legal combinations of components and parameters are achievable.

3. A method according to claim 1, wherein, at the step of offering components, only components are offered which respect constraints associated with each component and constraints for the assembly.

4. A method according to claim 1, the method further comprising visualizing, on a display device or printer associated with the computer system, a graphical or physical representation of at least a part of the configuration space represented by the second set of data.

5. A method according to claim 1, the method further comprising visualizing, on a display device or printer associated with the computer system, a graphical or physical representation of at least a part of the configuration represented by the third set of data.

6. A method according to claim 1, wherein the computer system is connected to a communications network, the method further comprising:
sending the second and/or the third set of data, via the communications network, to a further computer system, and
visualizing, on a monitor of said further computer system or any other device for displaying, a graphical image of the configuration space represented by the second set of data and/or a graphical image of the configuration represented by the third set of data.

7. A method according to claim 1, wherein the second set of data comprises data representing relationships between related components whereby the second set of data also represents connections between components.

8. A method according to claim 1, wherein the step of adding comprises connecting components in the assembly and/or adding a component to the assembly.

9. A method according to claim 1, wherein the step of deleting comprises disconnecting two components in the assembly and/or removing a component from the assembly.

10. A method according to claim 1, wherein the step of amending comprises at least one of:
amending data representing at least one component of the assembly,
connecting two components of the assembly, and
disconnecting two components of the assembly.

11. A method according to claim 1, wherein the separate data structure associated with said single component defines possible or allowed combinations of components of the cluster and/or parameter values of the components of the cluster.

12. A method according to claim 1, wherein the separate data structure constitutes a configuration database in which data representing possible or allowed combinations of components and/or parameter values are stored.

13. A method according to claim 1, wherein the separate data structure constitutes possible or allowed combinations of components and/or parameter values derived from a computation.

14. A method according to claim 1, wherein the step of generating the second set of data comprises:
performing, for each cluster, a check of whether the data representing the single component of that cluster, is compatible with constraints defined by mutually connected components in that cluster, and if the check reveals non-compatibility:
amending the second set of data and/or the data representing the single component in question while respecting constraints conferred of mutually connected components.

15. A method according to claim 1, wherein the second set of data comprises data representing a geometry of at least a part of the assembly, whereby the constraints of the components of said part of the assembly define constraints of a geometric nature on the parameters of the components.

16. A method according to claim 1, wherein the third set of data represents a state of a present configuration, the method comprising, at the step of repeating, automatically updating the second set of data in response to changes to the third set of data.

17. A method according to claim 16, wherein the present configuration is reproducible from the first and third set of data.

18. A computer system for configuring, in a memory of the computer system, a virtual representation of an assembly of a plurality of components, the computer system comprising:
a database storing a first set of data representing a plurality of categories of components, and, for each category, parameters and constraints defining limitations for configurations of each of the components within each of the categories, whereby all components in a category have common parameters and constraints,
a processor which is programmed to generate a second set of data representing the assembly of a plurality of components and representing a configuration space of said plurality of components, and to store the second set of data in a memory of the computer system, the second set of data comprising a separate data structure which defines valid combinations of components, the separate data structure being included in the second set of data in such a way that each separate data structure is associated with a particular component, whereby the constraints of the particular component reflects said valid combinations of components,
the processor being programmed to generate the second set of data while respecting the constraints associated with each component and constraints for the assembly, the processor being further programmed to generate a third set of data representing a present configuration in the configuration space,
the processor being further programmed to repeat the generation of the second set of data by:
offering only such components which, when added to the assembly, result in a valid combination of components, the offered components being derived from the separate data structure of the second set of data,
adding, to the second and third set of data, data which represent one of the offered components and which are derived from the first set of data, or
deleting data representing a component of the second and third set of data, or
amending data representing a previously added component of the second and third set of data,
while respecting the constraints associated with each component and constraints for the assembly, so as to arrive at an updated version of the second set of data, and at an updated version of the third set of data, wherein the processor is programmed to, in the memory of the computer system, create a set of clusters, each cluster containing data representing a single component as well as optionally at least one further component which is connected to said single component, whereby the set of clusters contains data representing all components comprised in the virtual representation.

19. A computer system according to claim 18, wherein data representing the plurality of components further comprise data representing parameters of the components, the processor being further programmed to, when generating the third set of data, offering a plurality of parameters of components, whereby only selected parameters are offered, the selected parameters being selected in accordance with constraints of components in such a way that only possible and/or legal combinations of components and parameters are achievable.

20. A computer system according to claim 18, wherein the processor is further programmed to only offer components and/or parameter values, which respect constraints associated with each component and constraints for the assembly.

21. A computer system according to claim 18, the computer system being connected to a display device or printer for visualizing a graphical or physical representation of at least a part of the configuration space represented by the second set of data.

22. A computer system according to claim 18, the computer system being connected to a display device or printer for visualizing a graphical or physical representation of at least a part of the configuration represented by the third set of data.

23. A computer system according to claim 18, the computer system being connected to a communications network, the computer system further comprising:
a communication interface for sending the second and/or the third set of data, via the communications network, to a further computer system connected to a display device for visualizing a graphical image of the configuration space represented by the second set of data and/or a graphical image of the configuration represented by the third set of data.

24. A computer system according to claim 18, wherein the processor is further programmed to, when adding data to the second and third set of data, connecting components in the assembly and/or adding a component to the assembly.

25. A computer system according to claim 18, wherein the processor is further programmed to, when deleting data from the second and third set of data, disconnecting two components in the assembly and/or removing a component from the assembly.

26. A computer system according to claim 18, wherein the processor is further programmed to, when amending the second and third set of data, perform at least one of:
amending data representing at least one component of the assembly,
connecting two components of the assembly, and
disconnecting two components of the assembly.

27. A computer system according to claim 18, wherein the processor is programmed to, at the step of generating the second set of data:
perform, for each cluster, a check of whether the data representing the single component of that cluster, is compatible with constraints defined by mutually connected components in that cluster, and if the check reveals non-compatibility:
amend the second set of data and/or the data representing the single component in question while respecting constraints conferred of mutually connected components.

28. A computer system according to claim 18, wherein the third set of data represents a state of the present configuration, the processor being further programmed to, at the step of repeating, automatically update the second set of data in response to changes to the third set of data.

29. A computer readable medium, storing computer executable instructions that provide a virtual representation of an assembly of a plurality of components, the instructions, which when executed on a computer system perform the steps of:
storing, in a database of the computer system, a first set of data representing a plurality of categories of components, and, for each category, parameters and constraints defining limitations for configurations of each of the components within each of the categories, whereby all components in a category have common parameters and constraints,
generating a second set of data representing the assembly of a plurality of components and representing a configuration space of said plurality of components, the second set of data comprising a separate data structure which defines valid combinations of components or parameter values, the separate data structure being included in the second set of data in such a way that each separate data structure is associated with a particular component, whereby the constraints of the particular component reflects said valid combinations of components or parameter values,
storing the second set of data in a memory of the computer system, the step of generating being performed while respecting the constraints associated with each component and constraints for the assembly, and generating a third set of data representing a present configuration in the configuration space, the step of generating comprising offering a plurality of components or component categories,
repeating the steps of generating a second set of data and generating a third set of data by:
offering only such components which, when added to the assembly, result in a valid combination of components, the offered components being derived from the separate data structure of the second set of data,
adding, to the second and third set of data, data which represent one of the offered components and which are derived from the first set of data, or
deleting data representing a component of the second and third set of data, or
amending data representing a previously added component of the second and third set of data,
while respecting the constraints associated with each component and constraints for the assembly, so as to arrive at an updated version of the second set of data, and at an updated version of the third set of data, wherein at least one of the step of generating the second set of data and the third set of data comprises creating a set of clusters, each cluster containing data representing a single component as well as optionally at least one further component which is connected to said single component, whereby the set of clusters contains data representing all components comprised in the virtual representation.

* * * * *